US011991998B2

(12) United States Patent
Iwabuchi et al.

(10) Patent No.: US 11,991,998 B2
(45) Date of Patent: May 28, 2024

(54) REEL SEAT AND FISHING ROD

(71) Applicant: SHIMANO INC., Sakai (JP)

(72) Inventors: Masakazu Iwabuchi, Sakai (JP); Shogo Kosaka, Sakai (JP); Yuzo Shimano, Sakai (JP); Soshi Iwata, Sakai (JP)

(73) Assignee: SHIMANO INC., Sakai (JP)

( * ) Notice: Subject to any disclaimer, the term of this patent is extended or adjusted under 35 U.S.C. 154(b) by 697 days.

(21) Appl. No.: 16/461,100

(22) PCT Filed: Oct. 31, 2017

(86) PCT No.: PCT/JP2017/039439
§ 371 (c)(1),
(2) Date: May 15, 2019

(87) PCT Pub. No.: WO2018/105275
PCT Pub. Date: Jun. 14, 2018

(65) Prior Publication Data
US 2020/0060249 A1 Feb. 27, 2020

(30) Foreign Application Priority Data
Dec. 8, 2016 (JP) .................................. 2016-238315

(51) Int. Cl.
*A01K 87/06* (2006.01)
*A01K 87/08* (2006.01)
(Continued)

(52) U.S. Cl.
CPC ........ *A01K 89/01925* (2015.05); *A01K 87/06* (2013.01); *A01K 87/08* (2013.01); *A01K 89/0193* (2015.05)

(58) Field of Classification Search
CPC .. A01K 87/06; A01K 87/08; A01K 89/01925; A01K 89/0193
(Continued)

(56) References Cited

U.S. PATENT DOCUMENTS 1,916,924 A * 7/1933 Foss ........................ A01K 87/06
43/22
2,667,713 A * 2/1954 Stephens ................. A01K 87/06
43/22
(Continued)

FOREIGN PATENT DOCUMENTS

| JP | 1-59064 U | 4/1989 |
| JP | 1-82765 U | 6/1989 |

(Continued)

OTHER PUBLICATIONS

Definition of "paling", Merriam-Webster, www.merriam-webster.com/dictionary/paling on Jun. 28, 2021 (Year: 2021).*
(Continued)

*Primary Examiner* — David J Parsley
(74) *Attorney, Agent, or Firm* — WHDA, LLP

(57) ABSTRACT

The reel seat for mounting a dual-bearing reel on an upper side of a rod main body of a fishing rod extends in a front-rear direction in a plan view of the reel seat. The reel seat includes a reel foot mounting part on the upper side for mounting a reel foot of the dual-bearing reel such that a handle of the dual-bearing reel is located on a first side in a right-left direction in the plan view. The reel seat also includes a support wall for supporting a palm of a hand when palming the reel seat such that the support wall provided on a second side opposite to the first side in the right-left direction, the support wall protruding to the upper side on the second side of the reel seat.

12 Claims, 29 Drawing Sheets

(51) Int. Cl.
*A01K 89/00* (2006.01)
*A01K 89/015* (2006.01)

(58) Field of Classification Search
USPC ................................................ 43/22, 23, 25
See application file for complete search history.

(56) References Cited

U.S. PATENT DOCUMENTS

| | | | | | |
|---|---|---|---|---|---|
| 2,711,047 | A | * | 6/1955 | Shepherd | A01K 87/08 43/23 |
| 2,965,995 | A | * | 12/1960 | Lasky | A01K 91/02 43/19 |
| 4,516,351 | A | * | 5/1985 | Highby | A01K 87/06 43/18.1 R |
| 4,577,432 | A | * | 3/1986 | Brackett | A01K 87/08 43/18.1 R |
| 4,631,853 | A | * | 12/1986 | Brackett | A01K 87/08 43/18.1 R |
| 4,644,680 | A | * | 2/1987 | Dawson | A01K 87/08 43/18.1 R |
| 4,762,584 | A | * | 8/1988 | Andreasen | B29C 45/14 156/245 |
| 4,793,087 | A | * | 12/1988 | McGee | A01K 87/08 43/22 |
| 4,905,400 | A | * | 3/1990 | Brackett | A01K 87/08 D22/142 |
| 5,222,319 | A | * | 6/1993 | Yamato | A01K 87/06 43/22 |
| 5,337,507 | A | * | 8/1994 | Oyama | A01K 87/08 43/22 |
| 5,396,727 | A | * | 3/1995 | Furuya | A01K 87/08 D22/142 |
| 5,632,111 | A | * | 5/1997 | Takizawa | A01K 87/06 43/20 |
| 6,016,982 | A | * | 1/2000 | Asano | A01K 89/01916 242/310 |
| 6,029,389 | A | * | 2/2000 | Newton | A01K 87/08 43/21.2 |
| 6,848,209 | B2 | * | 2/2005 | Ohmura | A01K 87/08 43/22 |
| 2006/0101702 | A1 | * | 5/2006 | LaCoste | A01K 87/08 43/25 |
| 2015/0040463 | A1 | | 2/2015 | Lin | |
| 2018/0020649 | A1 | * | 1/2018 | Kotarsky | A01K 87/06 43/23 |

FOREIGN PATENT DOCUMENTS

| | | |
|---|---|---|
| JP | 2-174624 A | 7/1990 |
| JP | 6-3075 U | 1/1994 |
| JP | 9-172915 A | 7/1997 |
| JP | 2548756 Y2 | 9/1997 |
| JP | 2008-271864 | 11/2008 |

OTHER PUBLICATIONS

International Search Report dated Jan. 30, 2018, issued in counterpart application No. PCT/JP2017/039439 (1 page).
English Translation of Office Action dated Jun. 28, 2021, issued in counterpart KR Application No. 10-2019-7017765. (3 pages).

* cited by examiner

REEL SEAT AND FISHING ROD

TECHNICAL FIELD

The present invention relates to a reel seat attached on a fishing rod for fixing a dual-bearing reel and to a fishing rod including the reel seat.

BACKGROUND ART

In generally, the dual-bearing reel is attached on the fishing rod upward. Therefore, the reel seat attached on the fishing rod upward for fixing the dual-bearing reel. So the fishing rod includes a reel foot mounting part configured to mount a reel foot of the dual-bearing reel thereon. The dual-bearing reel includes a left-right pair of side walls and includes a spool for winding a filing line between the right and left side walls. Furthermore, a handle is provided on one side wall from among the right and left side walls (hereinafter "handle side"). For example, if the handle is provided on the right side, the handle is positioned on an outer side of the right side wall. Thus, when winding the fishing line by rotating the right-side handle, the thumb of a left hand is placed on an upper surface of the left side wall of the dual-bearing reel and the other four fingers of the left hand are positioned on a lower surface of the reel seat and thus, the dual-bearing reel and the reel seat are enclosed in the whole left hand and thus held. Such a way of holding is generally referred to as palming (hereinafter "palming side").

A configuration to improve a fit feeling during palming is disclosed in prior arts 1 to 4 listed below, however, an improvement is not sufficient.

CITATION LIST

Patent Literature

PTL 1: Japanese Unexamined Patent Publication No. H9-172915
PTL 2: Japanese Utility Model Publication No. H6-3075
PTL 3: Japanese Utility Model Publication No. H2-174624
PTL 4: Japanese Utility Model Publication No. H1-82765

SUMMARY OF INVENTION

Technical Problem

An aim of the present invention is to provide a reel seat and a fishing rod allowing for an improvement of a fit feeling during palming and a reduction of a burden on a fisher.

Solution to Problem

The present invention was contrived in order to solve the above-described problem and a reel seat according to the present invention includes a cylindrical reel seat main body. The reel seat main body includes a reel foot mounting part for mounting a reel foot of a dual-bearing reel. The reel seat main body includes a support wall. The support wall supports a palm of a hand during palming. The support wall protrudes upward from a palming side of the reel seat main body at behind a paling side of left and right sides of the dual-bearing reel.

When a dual-bearing reel is attached to the reel seat configured as described above, the support wall is positioned behind the side wall of the dual-bearing reel on the palming side. For example, when the handle is positioned on the right side, the support wall is positioned behind the left side wall of the dual-bearing reel. During palming, the dual-bearing reel and the reel seat are held in a way to be enveloped by a left hand that is a hand on the palming side. In this state, the support wall abuts and supports a palm of the left hand (palming hand). That is, the palm of the left hand is supported during palming from an inner side by the support wall behind the palming side wall of the dual-bearing reel.

In particular, it is preferable that the reel seat main body includes a fixed hood part configured to be inserted a rear end of the reel foot therein, and the support wall is arranged on a palming side of the fixed hood part and is arranged to protrude more upward than a top part of the fixed hood part, in order to further improve a fit feeling.

Furthermore, it is preferable that a topmost part of the support wall is positioned more on the rear side than the top part of the fixed hood part, in order to further improve the fit feeling.

Furthermore, it is preferable that the support wall comprises a front-side inclined surface inclined so as to gradually ascend rearward and a rear-side inclined surface extending behind the front-side inclined surface and being inclined so as to gradually descend rearward. The front-side inclined surface of the support wall faces at least of a lower surface of the paling side of the dual-bearing reel, and the rear-side inclined surface of the support wall abuts and supports a palm thenar of the hand during palming. In this configuration, the support wall includes the front-side inclined surface and the front-side inclined surface faces a rear surface of the palming side wall of the dual-bearing reel, and thus, it is not likely that a large space opens between the support wall and the lower surface rear part of the palming side wall of the dual-bearing reel, and the support wall fits better in the palm of the hand. Furthermore, the support wall includes the rear-side inclined surface and the rear-side inclined surface abuts and supports the palm thenar of the hand during palming and thus, the fit feeling during palming is further improved.

Furthermore, it is preferable that a lateral bulging part bulging laterally is formed on palming side part of the reel seat main body, and the support wall is arranged behind the lateral bulging part to protrude upwards, and thus, the fit feeling is further improved by the lateral bulging part and the support wall.

Furthermore, it is preferable that the reel seat main body comprises a fixed member fixed to the rod main body and including the reel foot mounting part, and an exchangeable member attachable and detachable to and from the fixed member in a state where the fixed member is attached to the rod main body, and the support wall is formed on the exchangeable member. In this configuration, a fisher can himself detach the exchangeable member of the reel seat main body from the fixed member in a state where the reel seat is attached to the fishing rod and further, can attach the exchangeable member to the fixed member. Therefore, when a exchangeable member of another specification is available, the fisher can easily change to the exchangeable member of the other specification, without requesting refitting or disassembling of the fishing rod from the manufacturer. For example, an exchange for an exchangeable member having a support wall of different size or height and the like, is easily possible. Furthermore, an exchange from an exchangeable member in which the support wall is disposed on the left side to an exchangeable member in which the support wall is disposed on the right side is also easily possible and thus, the fisher can suitably exchange the exchangeable member and enjoy fishing in accordance with a fisher's preference and a condition, and in accordance with a size of the used dual-bearing reel and a left-right placement of the handle.

Furthermore, the fishing rod according to the present invention includes the reel seat described above.

Advantageous Effects of Invention

As described above, the support wall is disposed on only one of the left and right side parts and the support wall is positioned immediately behind one side wall of the dual-bearing reel to support the palm of the hand and thus, the fit feeling during palming is improved and the burden on the fisher's hand is reduced. Thus, fishing can be performed comfortably over a long time.

DESCRIPTION OF EMBODIMENTS

Figure 18:
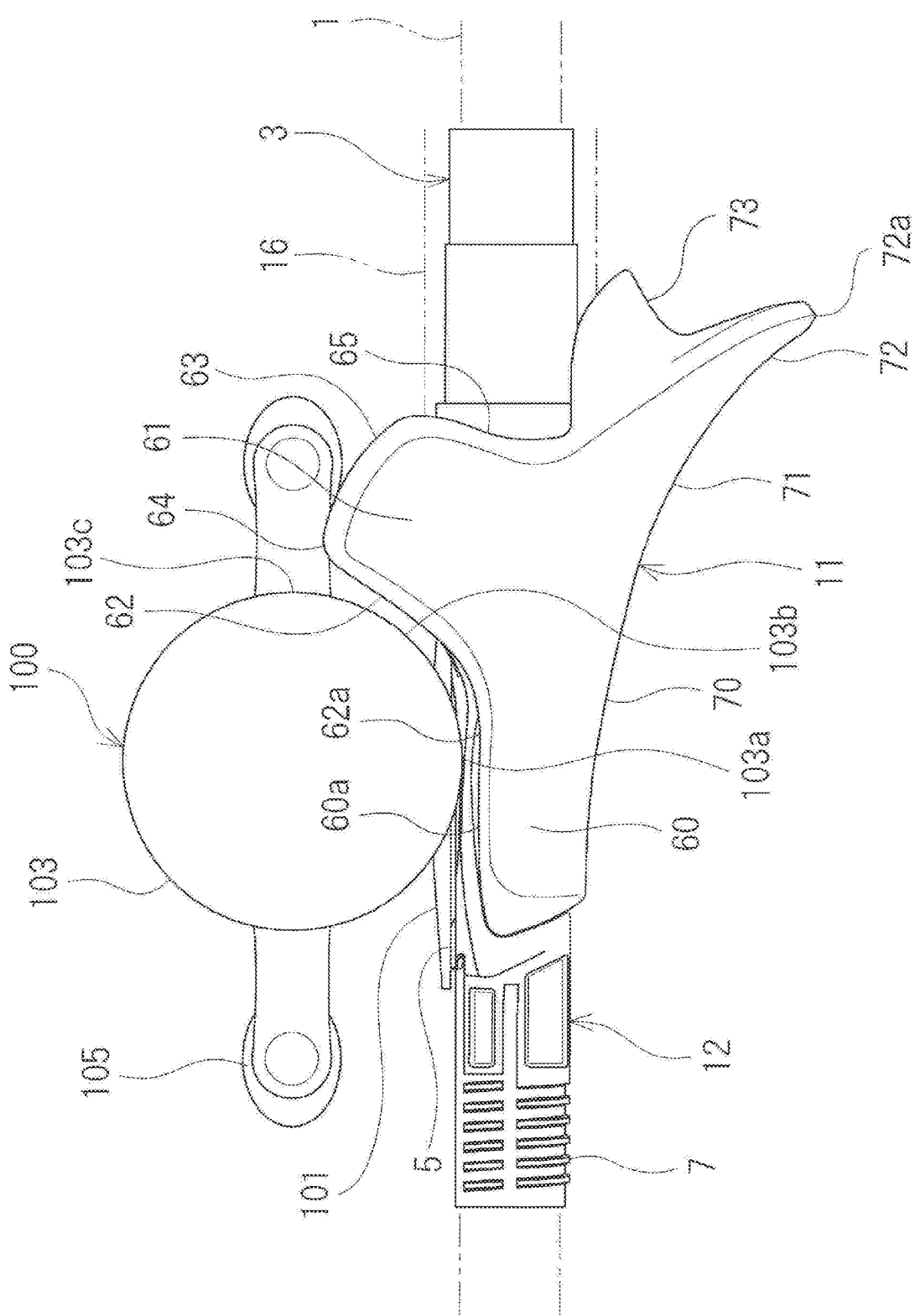
FIG. 18 is a front view illustrating a usage state in which the dual-bearing reel is attached to a fishing rod including the reel seat.
Figure 19:
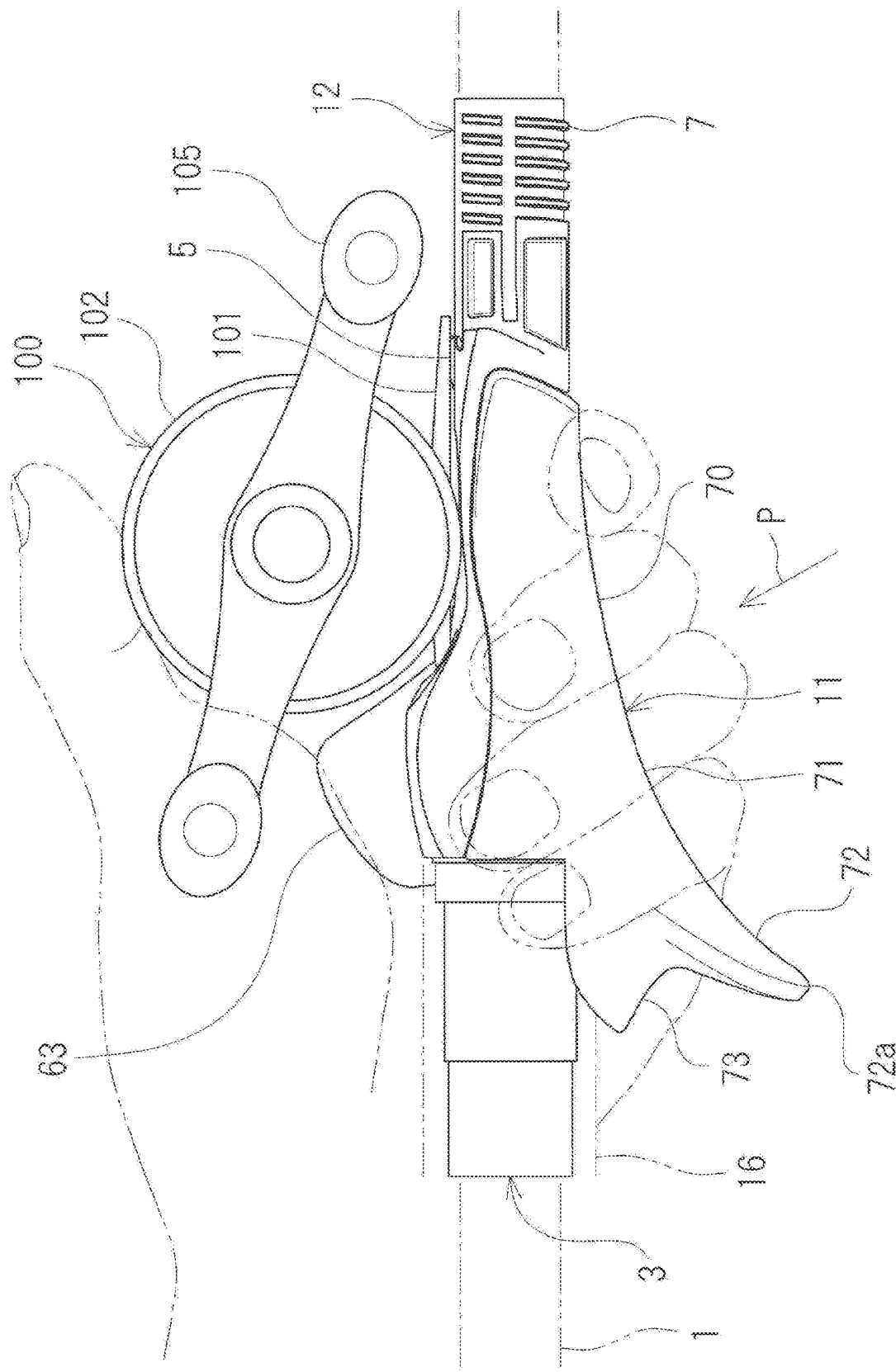
FIG. 19 is a rear view illustrating the usage state in which the dual-bearing reel is attached to the fishing rod including the reel seat.
Figure 20:
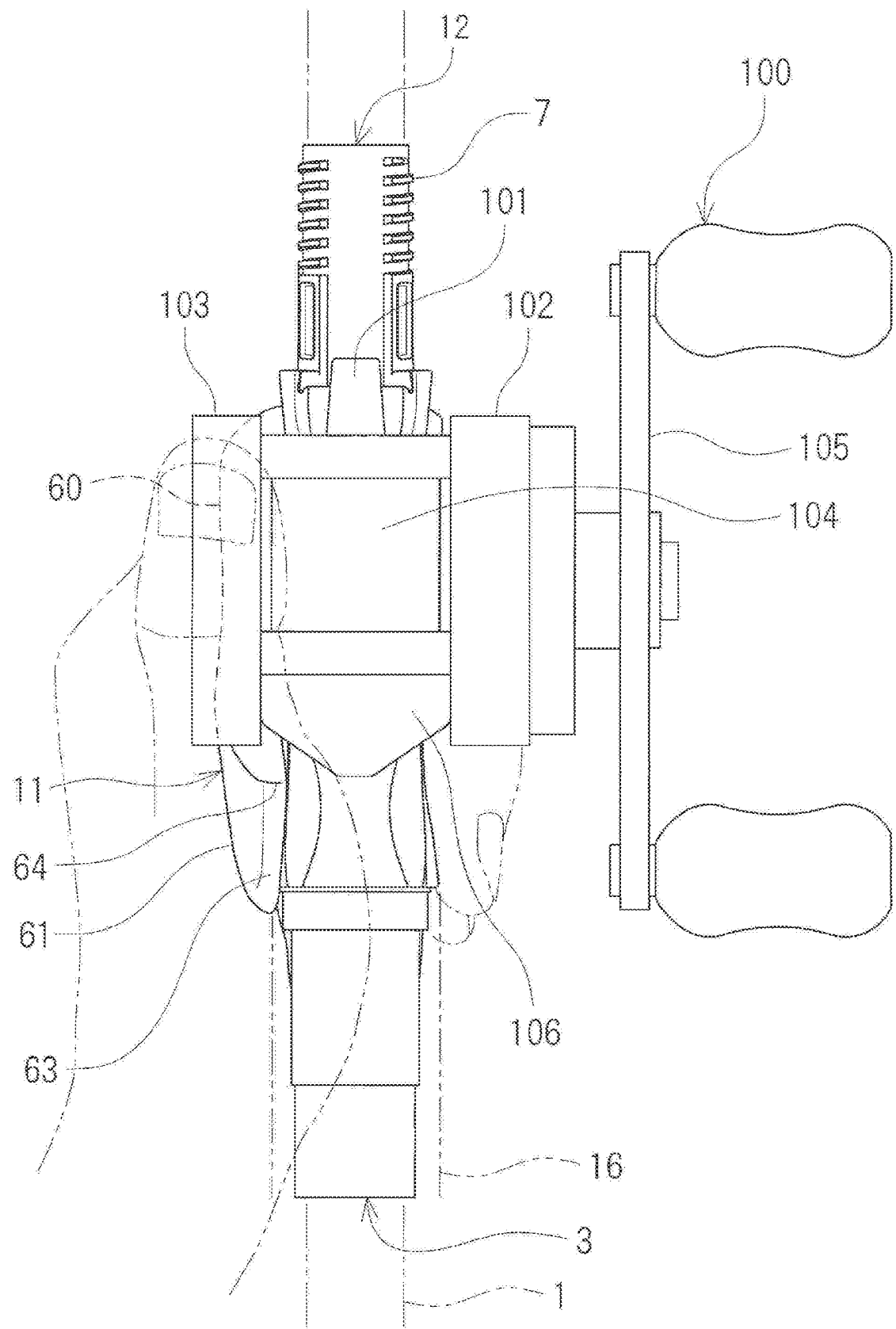
FIG. 20 is a plan view illustrating the usage state in which the dual-bearing reel is attached to the fishing rod including the reel seat.
Figure 21:
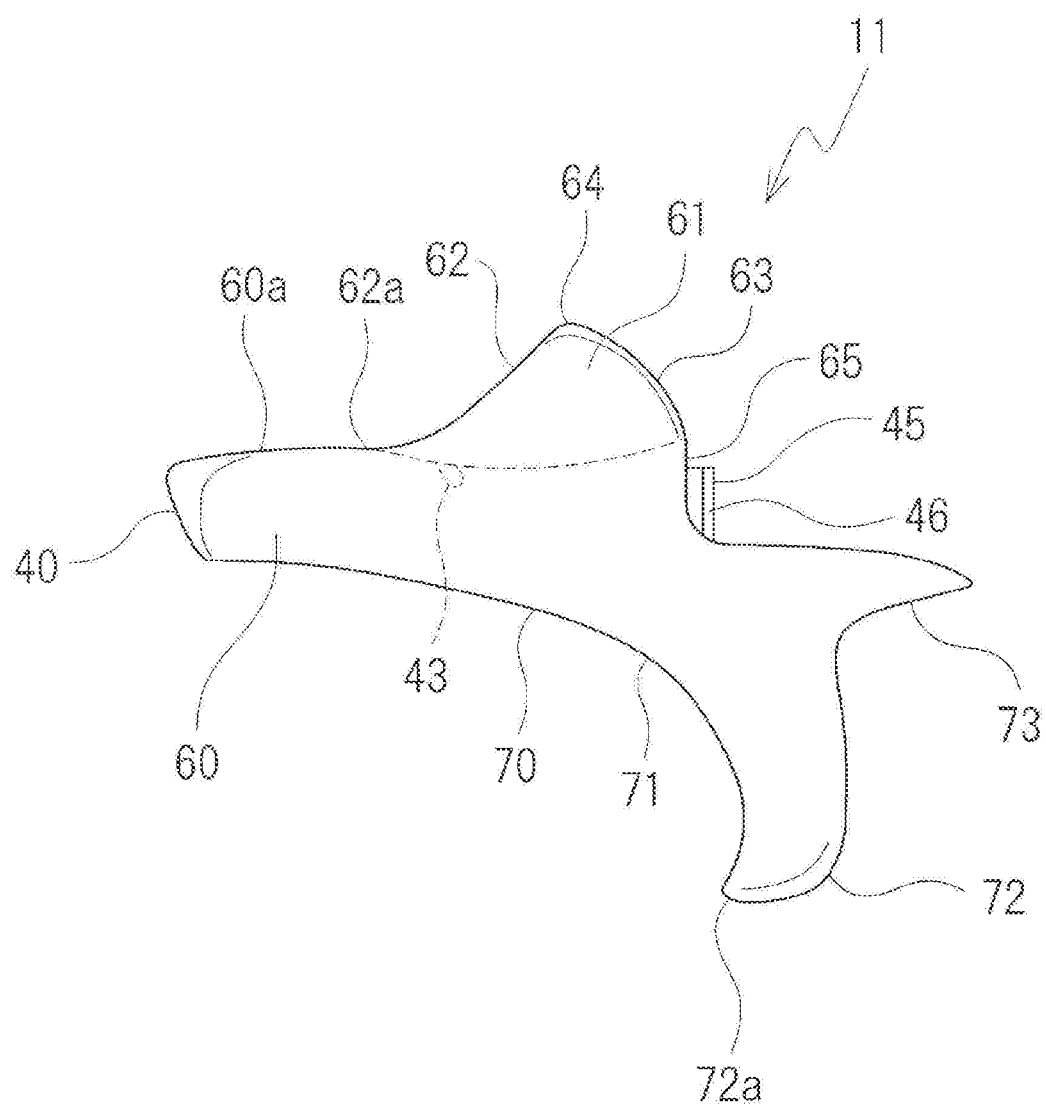
FIG. 21 is a front view illustrating an exchangeable member of a reel seat according to another embodiment of the present invention.
Figure 22:
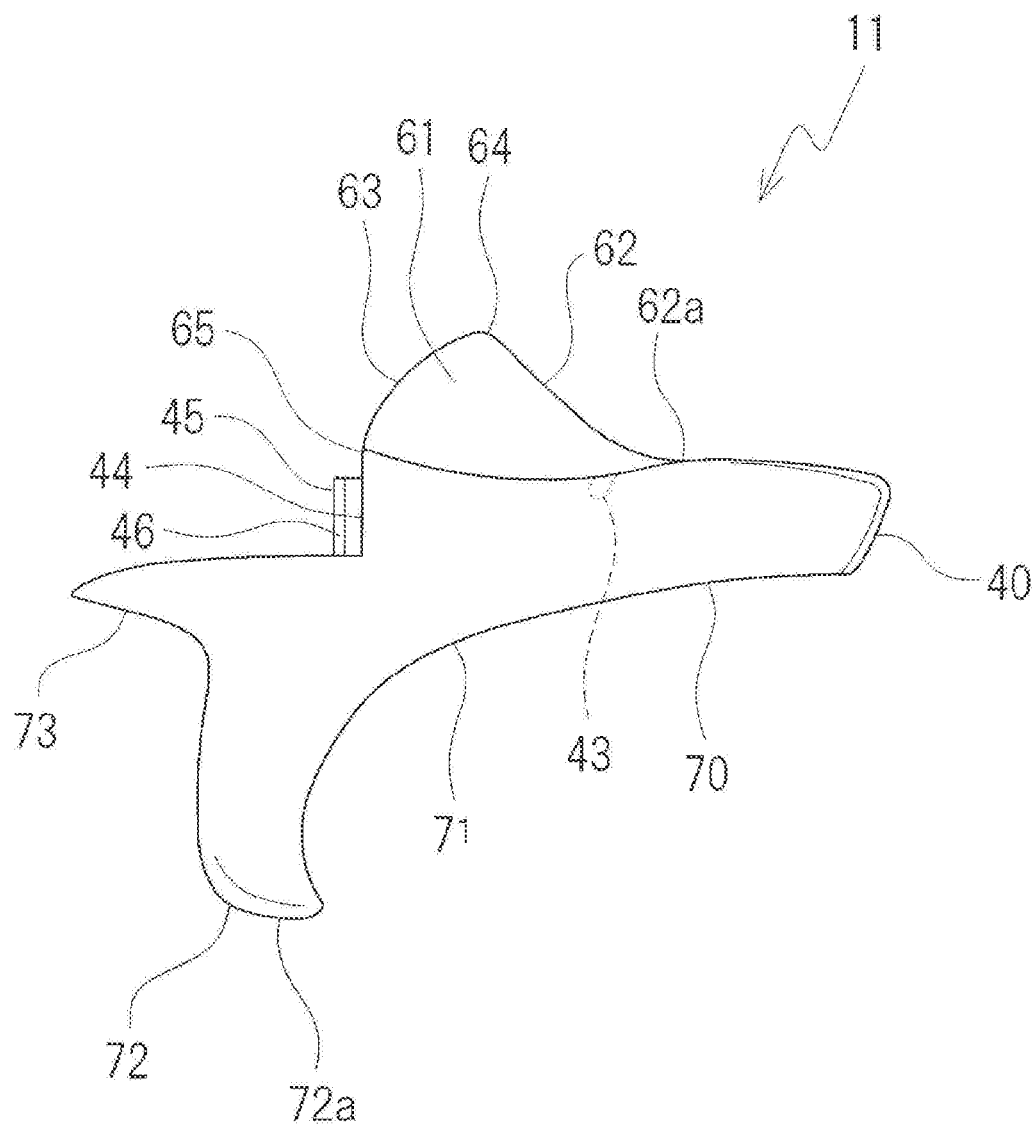
FIG. 22 is a rear view of the exchangeable member.
Figure 23:
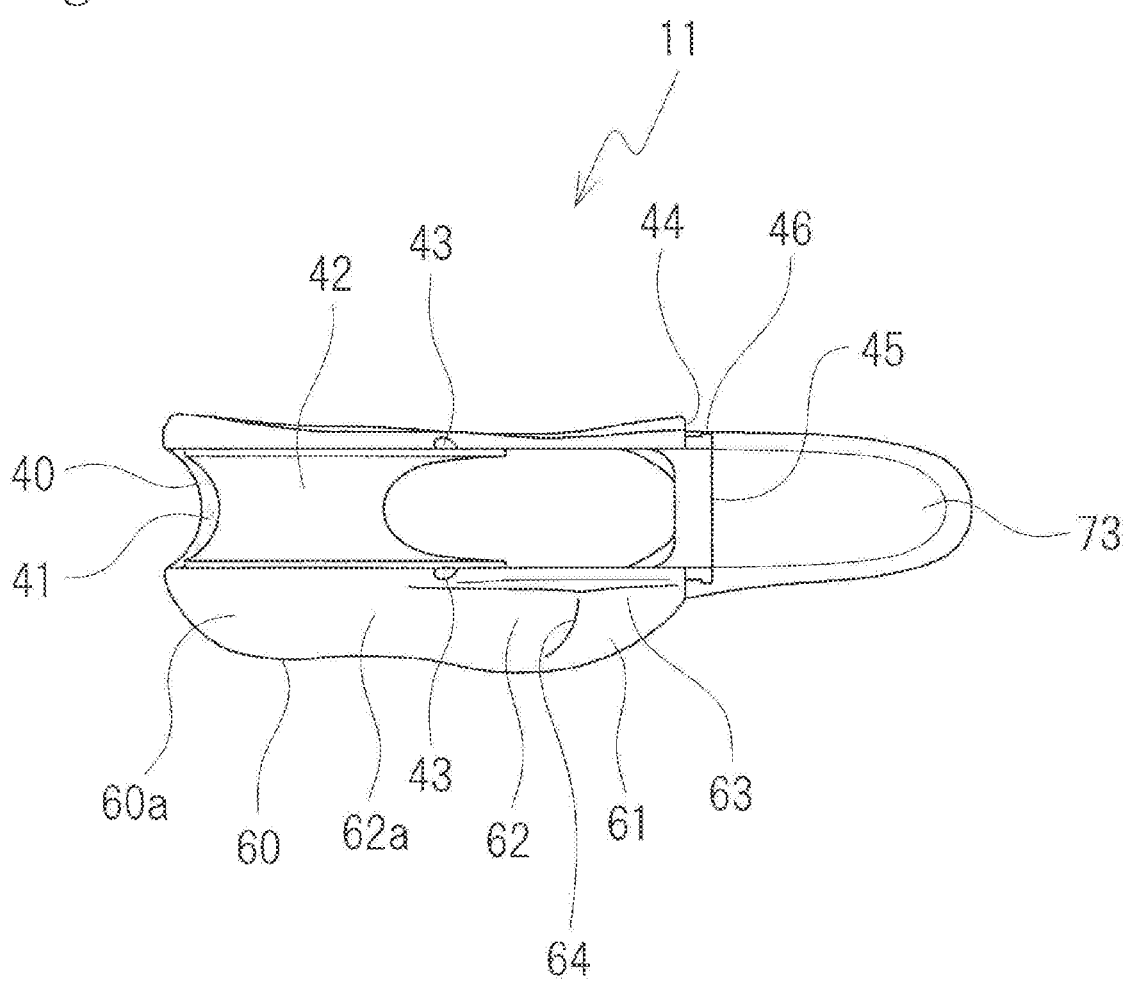
FIG. 23 is a plan view of the exchangeable member.
Figure 24:
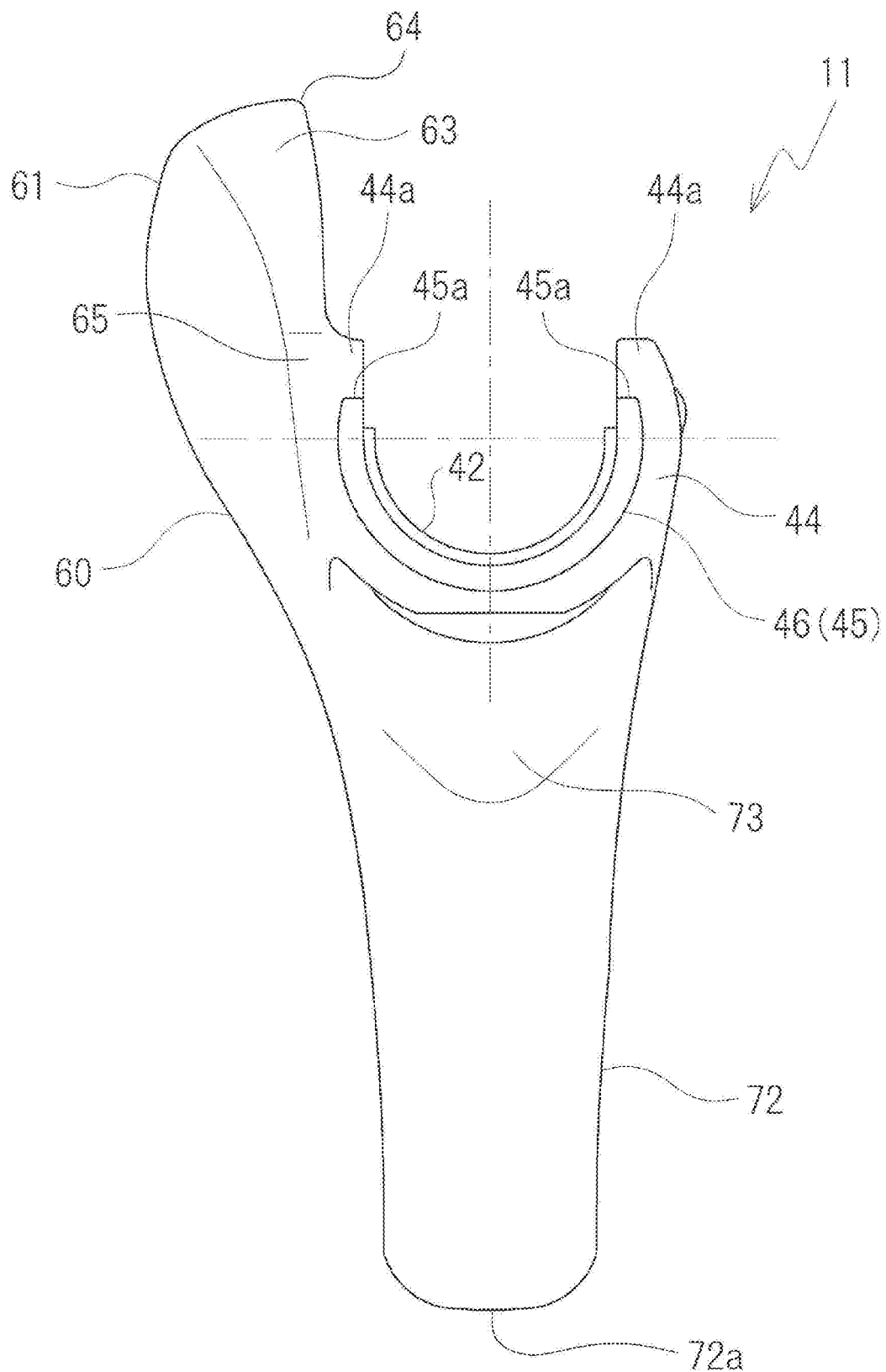
FIG. 24 is a side view of the exchangeable member seen from the butt side of the rod in the axial direction.
Figure 25:
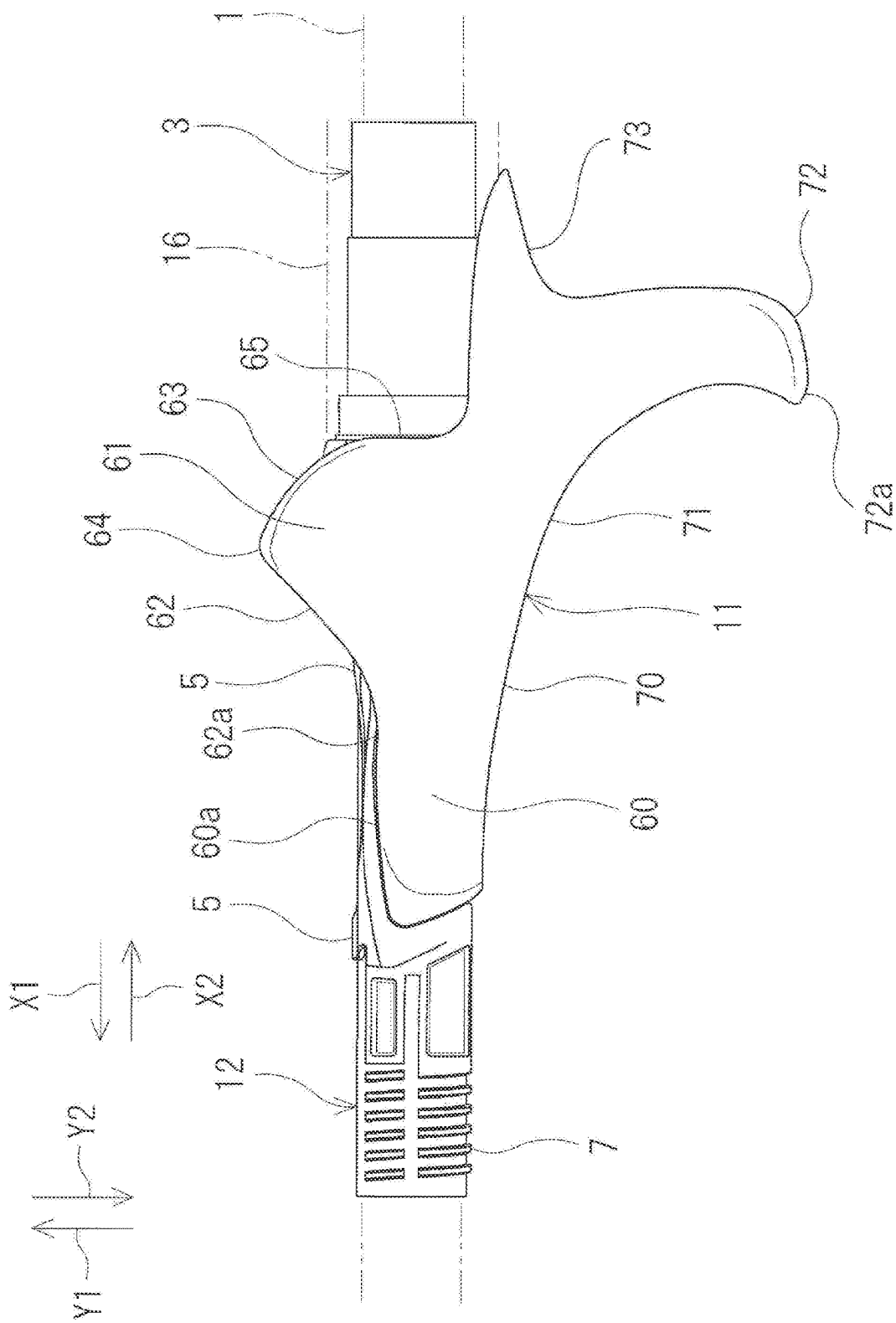
FIG. 25 is a front view of the reel seat.
Figure 26:
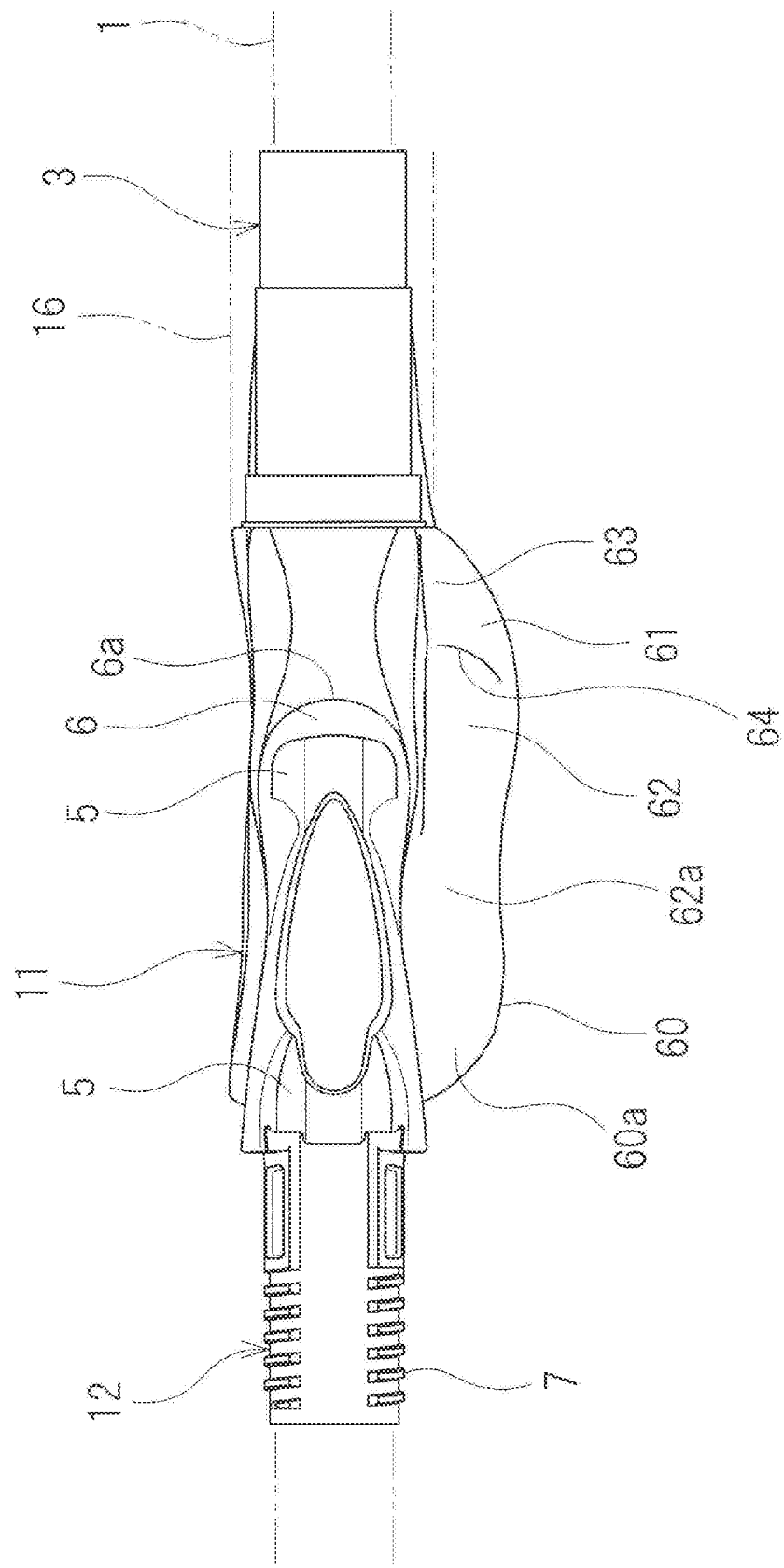
FIG. 26 is a plan view of the reel seat.
Figure 27:
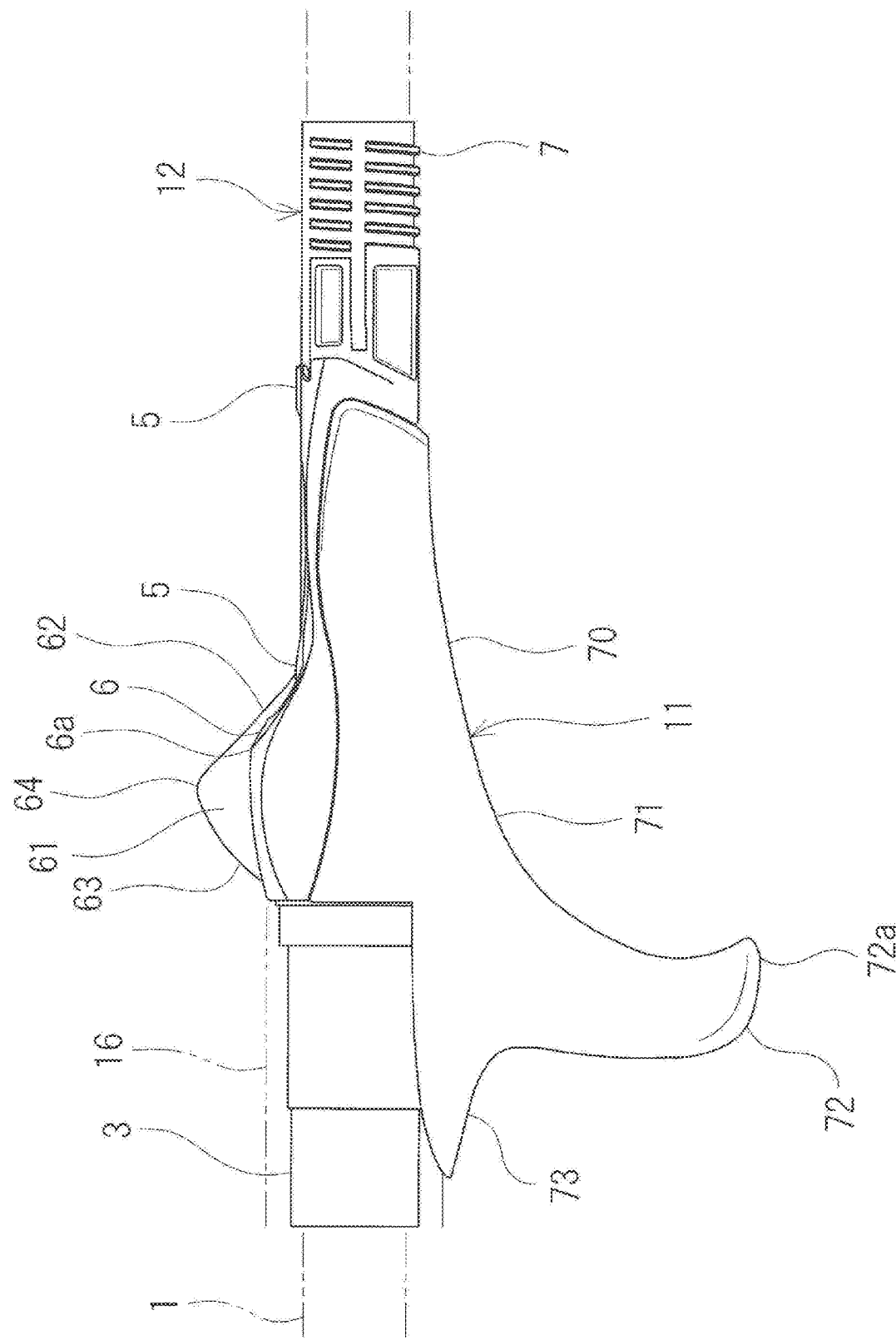
FIG. 27 is a rear view of the reel seat.
Figure 28:
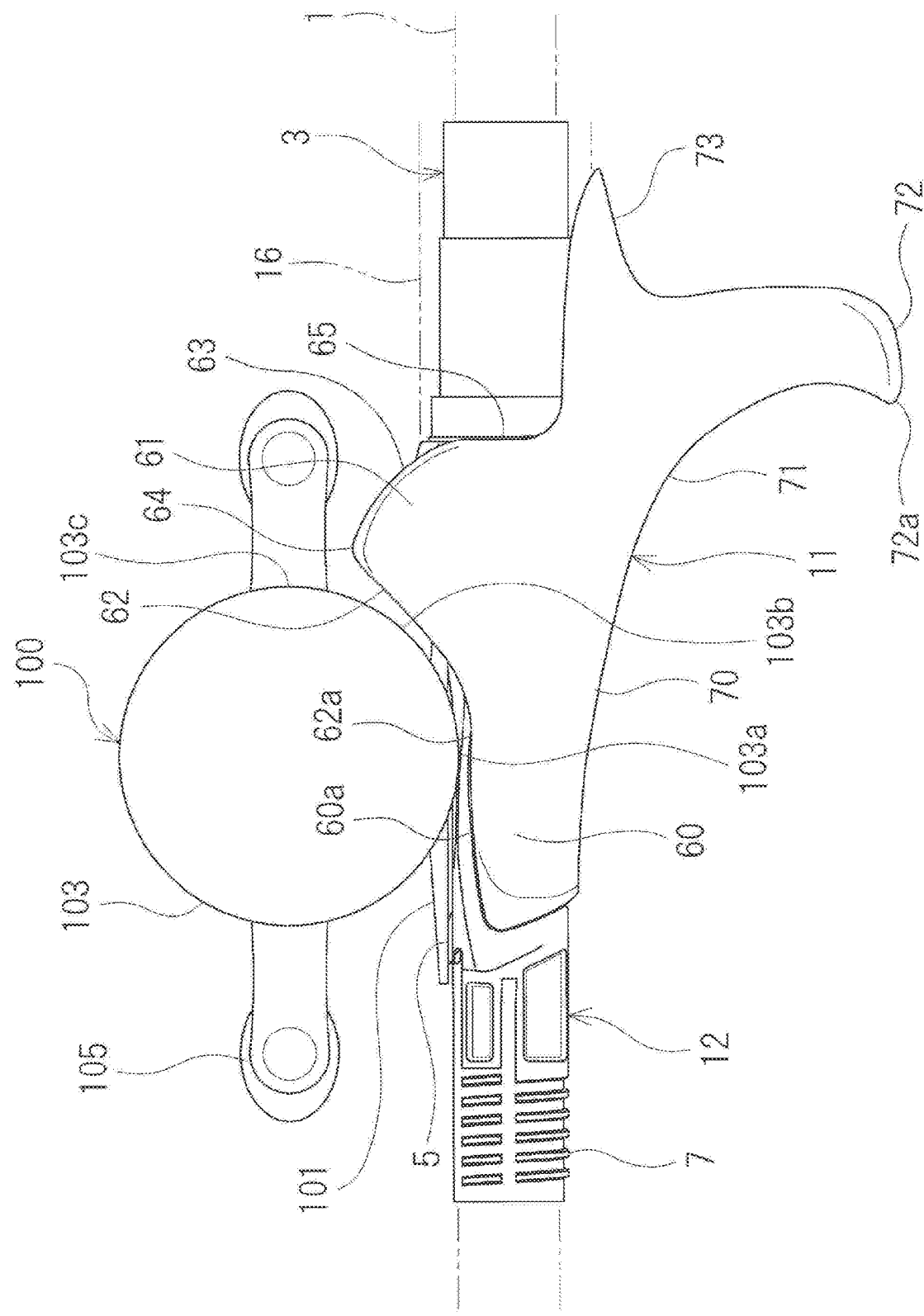
FIG. 28 is a front view illustrating a usage state in which the dual-bearing reel is attached to a fishing rod including the reel seat.
Figure 29:
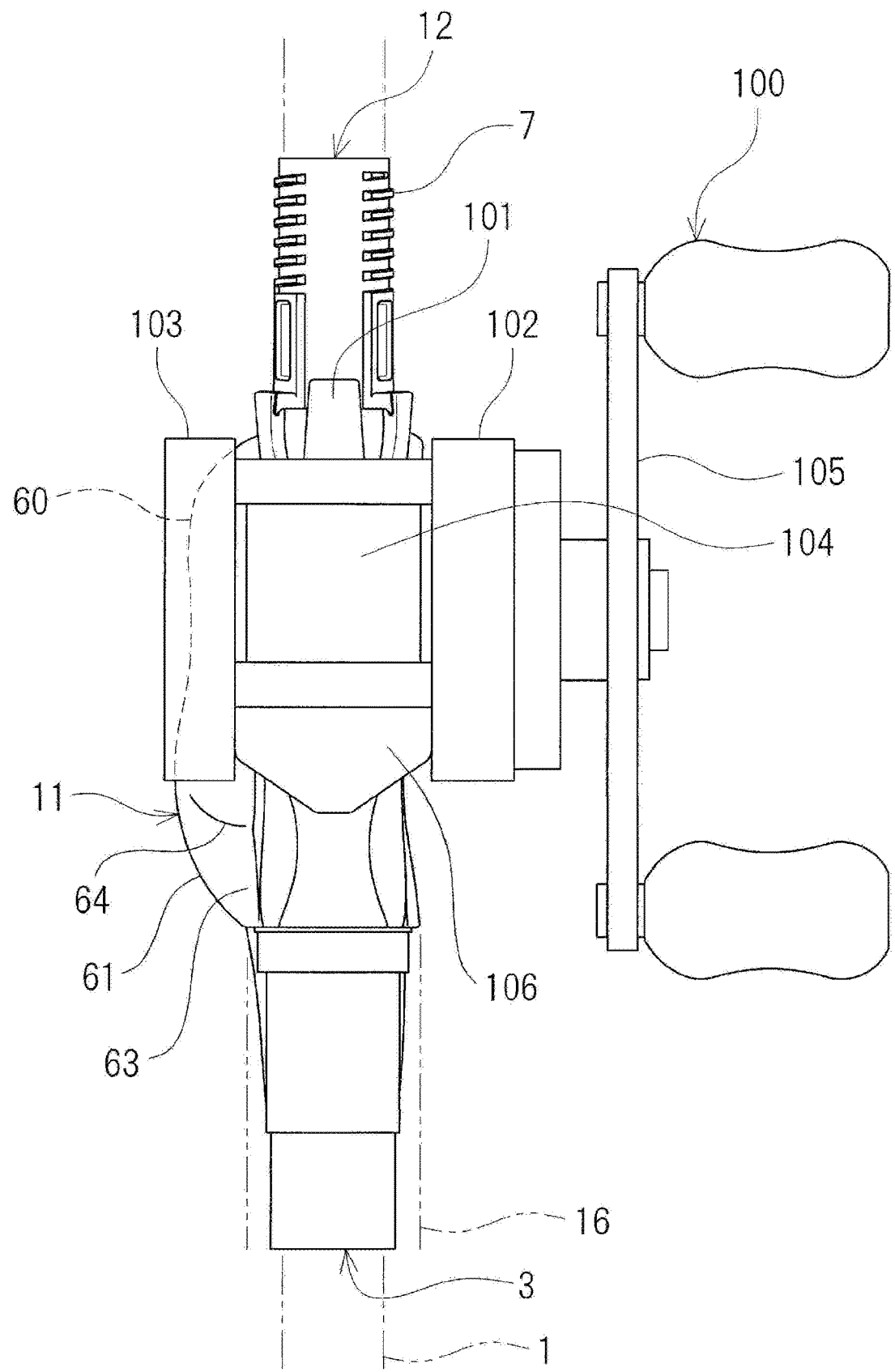
FIG. 29 is a plan view illustrating the usage state in which the dual-bearing reel is attached to the fishing rod including the reel seat.

Below, a reel seat according to an embodiment of the present invention will be described with reference to FIGS. 1 to 20. The reel seat according to the present embodiment is used for attaching a dual-bearing reel 100 to a fishing rod and the dual-bearing reel 100 typically faces to an upper side in a usage state. The dual-bearing reel 100 may have various types of shapes and one example is illustrated in FIGS. 18 to 20. The dual-bearing reel 100 includes a reel main body and a reel foot 101. The reel main body includes a pair of left and right side walls 102, 103, a spool 104 positioned between the left and right side walls 102, 103 and supported rotatably by the left and right side walls 102, 103, a handle 105 for rotating the spool 104, and a clutch 106 for connecting and disconnecting a rotation of the spool 104 and a rotation of the handle 105. The pair of left and right side walls 102, 103 have approximately the same shape and in the present embodiment, have a circular shape seen from the front and are nearly disc-shaped, however, a shape seen from the front may be an elliptical shape that is longer in the front-rear direction, and the like. The pair of left and right side walls 102, 103 are aligned parallel on the left and right in plan view and connected to each other at predetermined locations on the front and rear. Furthermore, in plan view, the left and right side walls 102, 103 are arranged evenly on the left and right with the rod main body 1 as the center, as illustrated in FIG. 20. Moreover, in plan view, the left side wall 103 is positioned to protrude or project more on the left side Z2 than the rod main body 1 and the right side wall 102 is positioned to protrude or project more on the right side Z1 than the rod main body 1 in the right-left direction Z. In any case, when the dual-bearing reel 100 is attached to the fishing rod, the left and right side walls 102, 103 laterally project by the same distance to the left and right with respect to the rod main body 1, respectively. The spool 104 is configured to wind a fishing line by rotating around an axis of a left-right direction. The handle 105 is disposed rotatably on either one of the right side wall 102 and the left side wall 103 and in the present embodiment, a right-handle configuration is used in which the handle 105 is disposed on the right side wall 102, however, a left-handle configuration in which the handle 105 is disposed on the left side wall 103 may also be used. Similarly to the spool 104, the handle 105 is configured to rotate around the axis of the left-right direction. The handle 105 and the spool 104 may be on the same axis, that is, a rotation center line of the handle 105 and a rotation center line of the spool 104 may be positioned on a straight line, however, the rotation center line of the handle 105 and the rotation center line of the spool 104 may be in a parallel relationship and not on a straight line. The reel foot 101 is used to attach the dual-bearing reel 100 to the reel seat. The reel foot 101 is disposed on a lower end part of the reel main body and extends in the front-rear direction.

Figure 1:
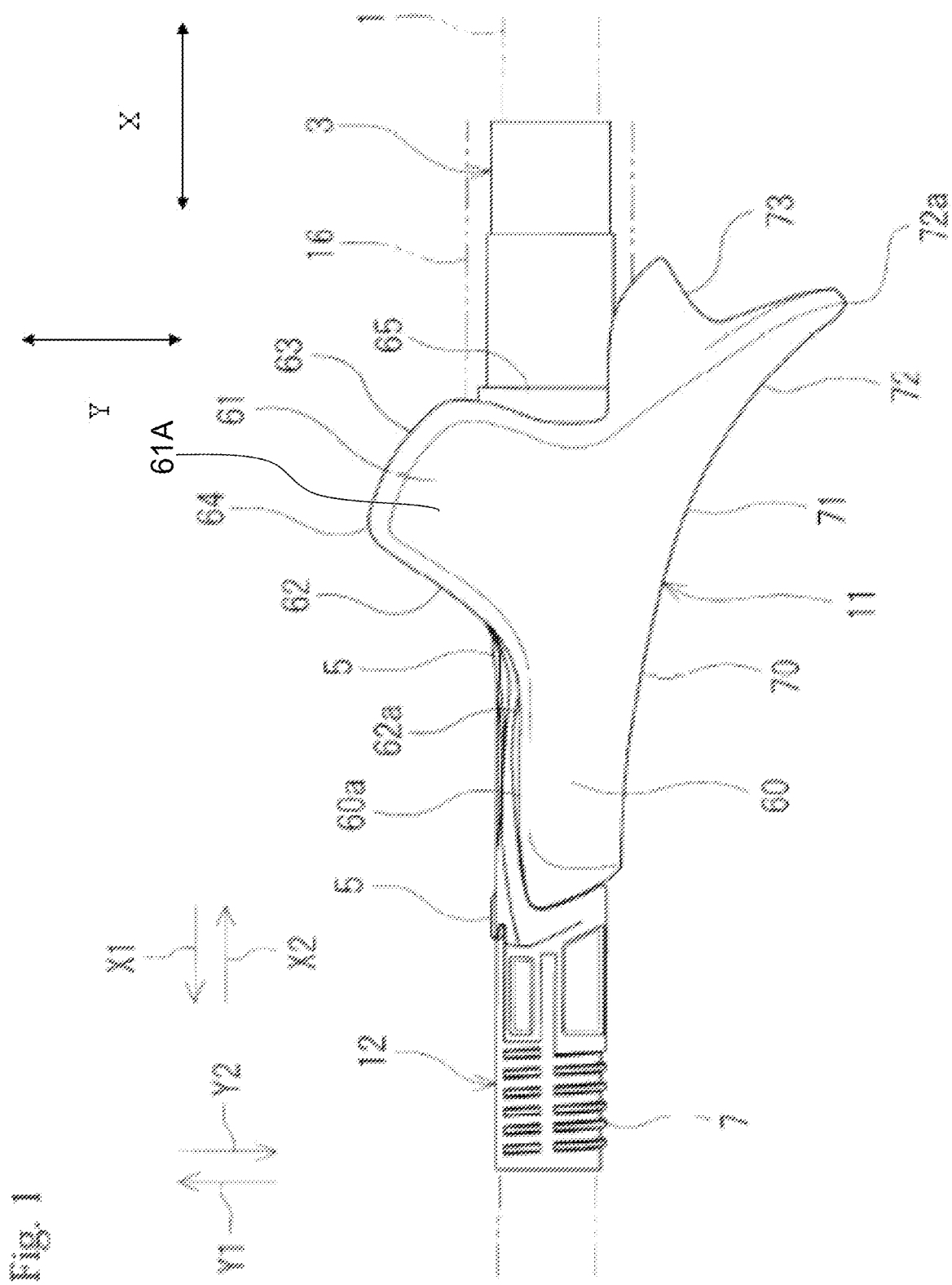
FIG. 1 is a front view of a reel seat according to an embodiment of the present invention.

The reel seat is a cylindrical structure mounted to an outside of a rod main body 1 (blank) and includes a reel seat main body, a holding-use nut 3 as a holding member, a hood-use nut (not illustrated), and a moveable hood. A center line of the reel seat coincides with a center line of the rod main body 1. An axial direction of the reel seat corresponds to a center line direction of the reel seat and an axial direction of the rod main body 1 corresponds to a center line direction of the rod main body 1. The axial direction of the reel seat and the axial direction of the rod main body 1 coincide. The axial direction of the reel seat is referred to as a front-rear direction. A front side is a tip side of the rod and a rear side is a butt side of the rod. In FIG. 1, the front side in the front-rear direction X is indicated by an arrow X1 and the rear side in the front-rear direction X is indicated by an arrow X2. Furthermore, a later-described reel foot mounting part 5 is assumed to be an upper side and an opposite side thereof is assumed to be a lower side. In FIG. 1, the upper side in the upper-lower direction Y is indicated by an arrow Y1 and the lower side in the upper-lower direction Y is indicated by an arrow Y2.

The reel seat main body has a cylindrical shape as a whole and the rod main body 1 is inserted in an inside of the reel seat main body. Thus, the reel seat main body includes a rod insertion aperture 4 in which the rod main body 1 is inserted. The reel seat main body is attached at a predetermined position of the rod main body 1. The reel seat main body is directly fixed by adhesion to an outer peripheral surface of the rod main body 1 or is fixed by adhesion via a cylindrical spacer (not illustrated) between the outer peripheral surface of the rod main body 1 and the reel seat main body, for example.

The reel seat main body includes the reel foot mounting part 5, a fixed hood part 6, a hood-use male screw part 7, a holding-use male screw part 8, a lateral bulging part 60, a support wall 61, and a palming grip part 70. The reel foot mounting part 5 is a portion for mounting the reel foot 101 illustrated in FIGS. 18 to 20 and is formed on an upper surface of the reel seat main body. The fixed hood part 6 is formed on a rear side of the reel foot mounting part 5. The fixed hood part 6 is a portion for holding a rear end part of the reel foot 101 and the rear end part of the reel foot 101 is inserted into the fixed hood part 6 from the front side. The reel seat includes a first rear portion 66A provided at the rear side X2 and the first side Z1 of the fixed hood part 6; and a second rear portion 66B provided at the rear side X2 and the second side Z2 of the fixed hood part 6.

On the other hand, the hood-use male screw part 7 is formed on an outer peripheral surface of a front part of the reel seat main body. The hood-use nut is screwed into the hood-use male screw part 7. The moveable hood is positioned at a rear side of the hood-use nut and the moveable hood is moveable in the front-rear direction, but not rotatable, with respect to the reel seat main body. The moveable hood is of cylindrical shape and a hood part that expands outwards in the radial direction is formed on a part of an upper part from among the entire circumference of the moveable hood. The hood part of the moveable hood is a portion configured to hold a front end part of the reel foot 101 and the front end part of the reel foot 101 is inserted into the hood part from a rear side relative to the hood part. A rear end part of the hood-use nut is locked rotatably relative to a front end part of the moveable hood and when the hood-use nut moves to the front or rear while rotating, the moveable hood moves to the front or rear in accordance with the movement, but does not rotate. The moveable hood can be approached to the fixed hood part 6 by moving the hood-use nut to the rear side and the reel foot 101 is sandwiched from the front side and rear side thereof by the moveable hood and the fixed hood part 6, thereby the reel foot 101 is fixed. On the other hand, when the hood-use nut is moved to the front side, the moveable hood is moved away from the fixed hood part 6 to the front side and the dual-bearing reel 100 can be detached from the fishing rod.

On an outer peripheral surface of a rear part of the reel seat main body, the holding-use male screw part 8 is formed into which the holding-use nut 3 is screwed. The holding-use male screw part 8 is positioned more on the rear side than the fixed hood part 6. Note that a smooth outer peripheral surface on which no male screw part is formed is present on a rear side of the holding-use male screw part 8 until the rear end and a length of the smooth outer peripheral surface is equal to or longer than a length of the holding-use male screw part 8.

Lateral Bulging Part 60

The reel seat main body has a left-right non-symmetrical shape. The reel seat main body includes the lateral bulging part 60 configured to bulge outwards in the left-right direction on only any one side surface from among both left and right side surfaces. The reel seat in the present embodiment serves for attaching the dual-bearing reel 100 including the handle 105 on the right side, that is, represents a right-handle type. Thus, the lateral bulging part 60 is formed only on the left side surface of the reel seat main body. During palming, the lateral bulging part 60 abuts against and supports an articulation portion (MP articulation) of joints of the four fingers from the index finger to the little finger of a hand's palm, or a spherical contact part. A front end part of the lateral bulging part 60 is positioned close to the rear end part of the moveable hood in a state where the moveable hood has moved to a rearmost side. The rear end part of the lateral bulging part 60 is positioned close to a front end part of a later-described cylindrical grip body 16 or close to a center part of the front-rear direction.

The lateral bulging part 60 has a shape in which an extent of bulging in the lateral direction gradually increases from a lower end to an upper end of the lateral bulging part 60. An outer surface of the lateral bulging part 60 smoothly continues from a lower surface of the reel seat main body and extends upwards while gradually inclining to the outside. Thus, the outer surface of the lateral bulging part 60 is an inclined surface directed outwardly from below to above. A front upper surface 60a of the lateral bulging part 60 is positioned at a slightly lower position than the reel foot mounting part 5, or at approximately the same height as the reel foot mounting part 5. In any case, the front upper surface 60a of the lateral bulging part 60 has a height that does not protrude upwards from the reel foot mounting part 5. Note that, as illustrated in FIG. 20, in plan view in a state where the dual-bearing reel 100 is attached to the reel seat, the lateral bulging part 60 does not protrude more outwardly (laterally) than the left side wall 103 of the dual-bearing reel 100. Thus, an outer edge of an upper surface (an upper edge of an outer surface) of the lateral bulging part 60 is positioned more inwardly than the left side wall 103 of the dual-bearing reel 100.

Support wall 61

Figure 2:
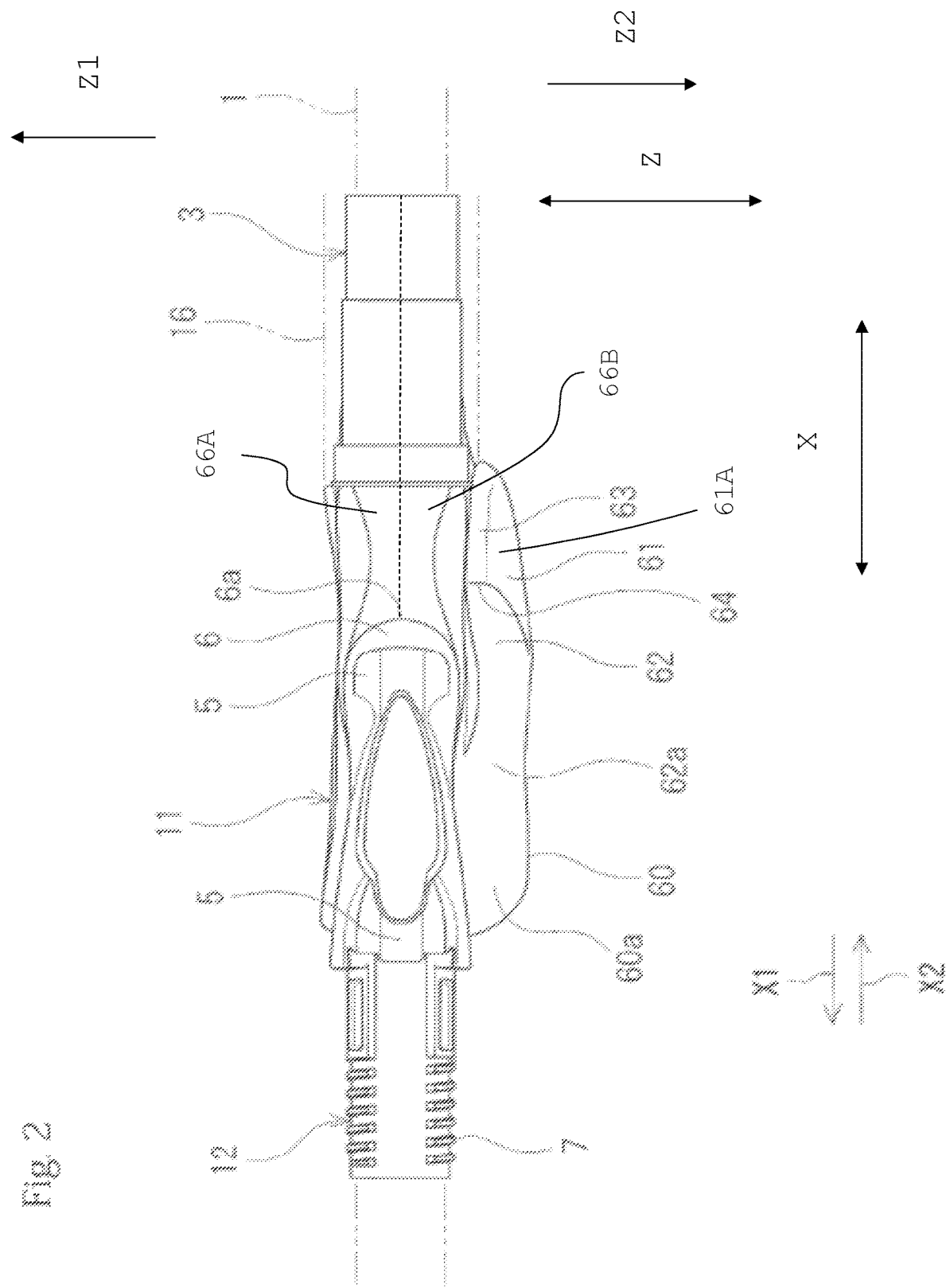
FIG. 2 is a plan view of the reel seat.
Figure 3:
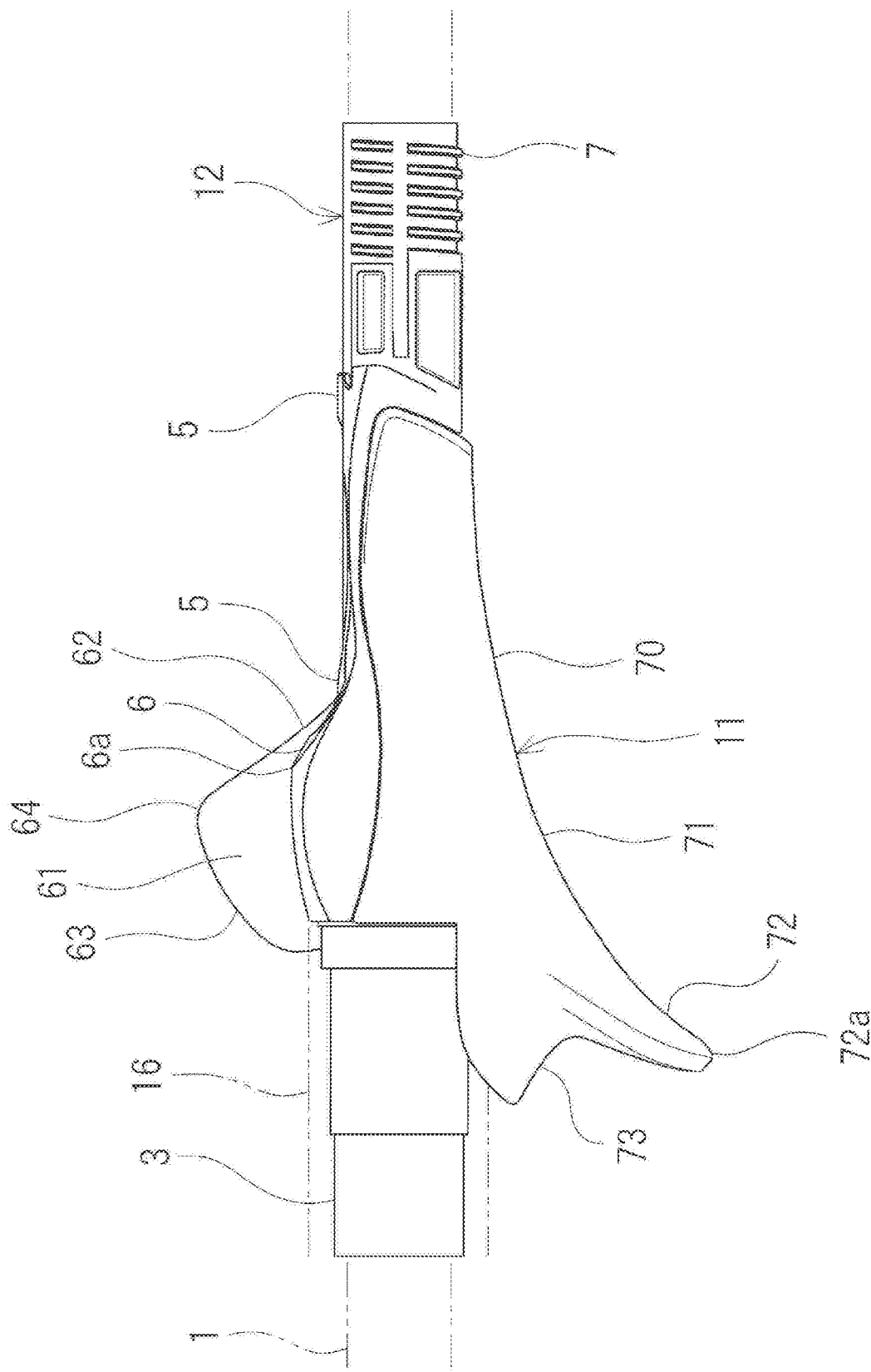
FIG. 3 is a rear view of the reel seat.
Figure 4:
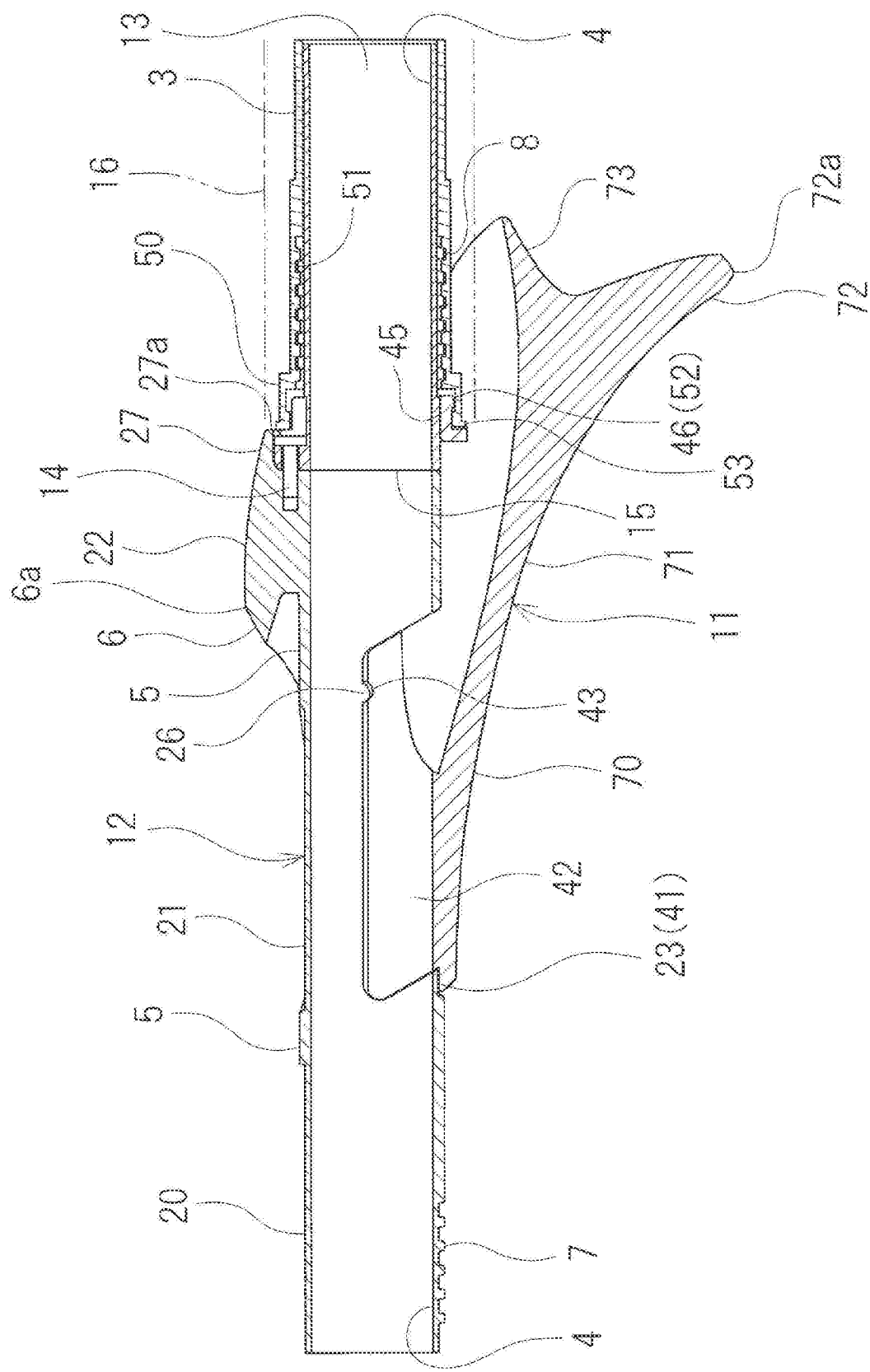
FIG. 4 is a longitudinal sectional view of the reel seat cut in the axial direction.
Figure 14:
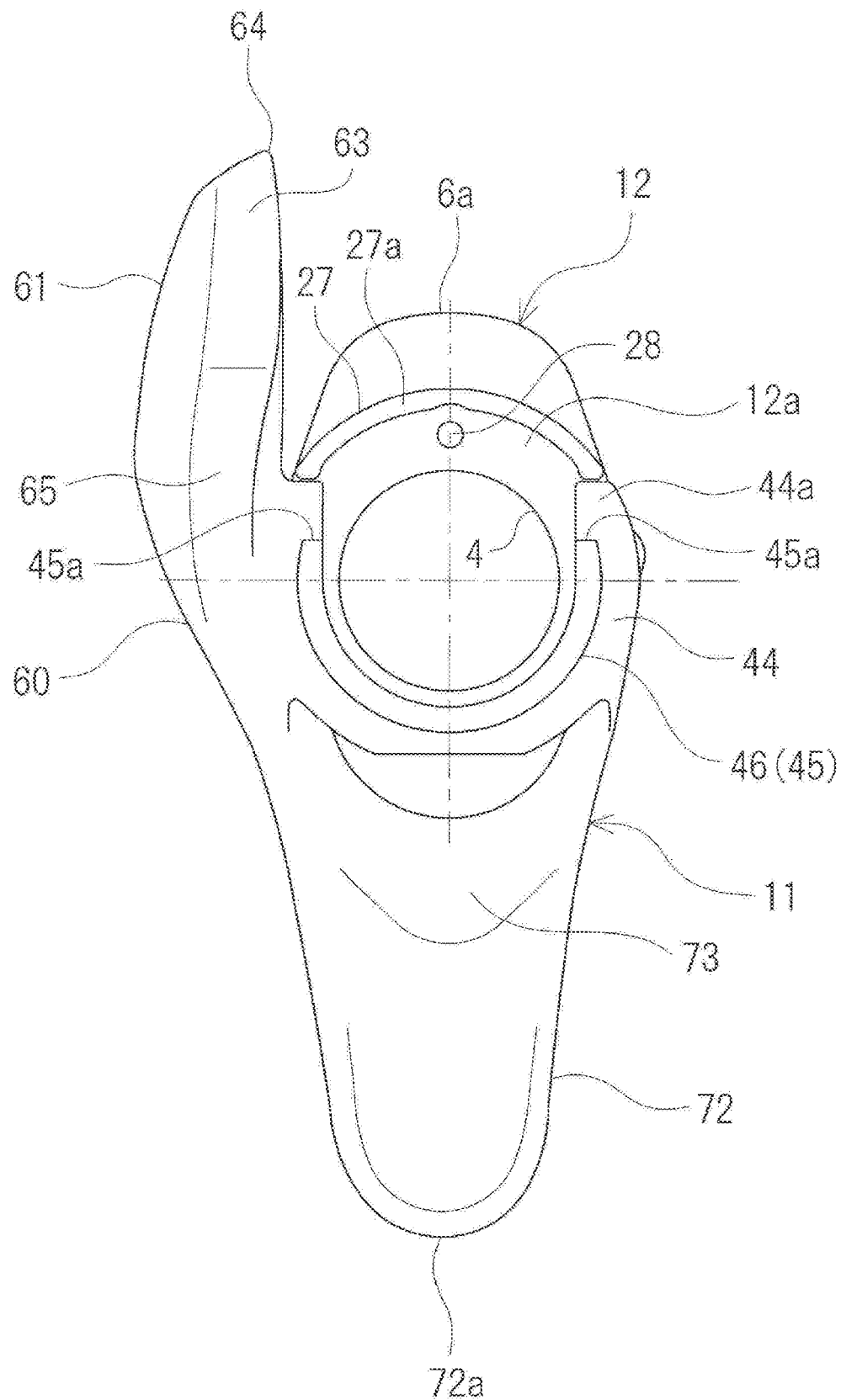
FIG. 14 is a side view of the exchangeable member and the main body member of the reel seat seen from the butt side of the rod in the axial direction.

On the other hand, as illustrated in FIGS. 1 and 3, the support wall 61 having a support wall portion 61A is arranged behind the lateral bulging part 60 to protrude upwards. During palming, the support wall 61 abuts against a hand's palm and supports the hand's palm from an inner side. As illustrated in FIGS. 2, 3, and 14, the support wall 61 is positioned on a side of the fixed hood part 6. The support wall 61 has a shape having an inner surface at an inner side of the left-right direction and an outer surface at an outer side of the left-right direction and has a tabular shape with a thickness of a dimension between the inner surface and the outer surface. That is, a plate thickness direction of the support wall 61 is the left-right direction. An inner surface of the support wall 61 is located at a position laterally spaced from a center line of the reel seat main body, is approximately parallel to the center line of the rod main body 1 and rises vertically upward. The inner surface of the support wall 61 may continue from an upper surface of the fixed hood part 6 and extend from the upper surface of the fixed hood part 6 so as to rise upwards, however, in the present embodiment, the inner surface of the support wall 61 extends upwards so as to rise from a lower end part of a left side surface of the fixed hood part 6. Thus, a trough part or a valley part is formed between the fixed hood part 6 and the support wall 61. An outer surface of the support wall 61 smoothly continues from the outer surface of the lateral bulging part 60. As described above, the outer surface of the lateral bulging part 60 is inclined more to the outside toward upwards, while the outer surface of the support wall 61, on the other hand, is inclined more to the inside toward upwards. It is preferable that the outer surface of the lateral bulging part 60 and the outer surface of the support wall 61 are a set and constitute one curved surface bent to protrude outwardly. Furthermore, it is preferable that the wall thickness of the support wall 61 becomes gradually thinner toward the upper side and it is preferable that the thickness of the support wall 61 becomes gradually thinner toward the rear side.

The support wall 61 protrudes more upwardly than a top part 6a of the fixed hood part 6 and a topmost part 64 of the support wall 61 is positioned more to the rear side than the top part 6a of the fixed hood part 6. A front-side inclined surface 62 inclined so as to gradually ascend to the rear side and a rear-side inclined surface 63 extending behind the front-side inclined surface 62 and being inclined so as to gradually descend to the rear side, are disposed on a top surface of the support wall 61. The front-side inclined surface 62 is continuous to the front upper surface 60a of the lateral bulging part 60 and gradually ascends from the front upper surface 60a toward the rear side. Note that a front end part 62a of the front-side inclined surface 62 is positioned more to the front side than the fixed hood part 6. The front-side inclined surface 62 ascends until the topmost part 64 of the support wall 61. The topmost part 64 of the support wall 61 is a boundary part between the front-side inclined surface 62 and the rear-side inclined surface 63 and the rear-side inclined surface 63 gradually descends to the rear side from the topmost part 64 of the support wall 61. The rear-side inclined surface 63 extends until a position more on the rear side than a rear end part of the fixed hood part 6 and is connected to a rear surface 65 of the support wall 61. It is preferable that the front-side inclined surface 62 and the rear-side inclined surface 63 form a taper surface inclined so as to descend to the outer side. In particular, it is preferable that the rear-side inclined surface 63 descends at a larger angle to the outer side than the front-side inclined surface 62. Note that the front-side inclined surface 62 and the rear-side inclined surface 63 may smoothly continue to the outer surface of the support wall 61. It is preferable that the rear surface 65 of the support wall 61 is a taper surface inclined such that the surface goes forward, as it goes outward.

Palming Grip Part 70

The palming grip part 70 is formed on a lower part of the reel seat main body. During palming, the palming grip part 70 abuts against and supports a back surface from the index finger to the little finger (a surface on a side of a hand's palm). The palming grip part 70 is formed on a portion corresponding to a lower side of the reel foot mounting part 5 and on a portion corresponding to a lower side of the fixed hood part 6, from among a lower surface of the reel seat main body, and extends rearward beyond the portion corresponding to the lower side of the fixed hood part 6 until a lower side position close to a central part of the holding-use male screw part 8 in the front-rear direction. On a lower surface of the palming grip part 70, a downward inclined surface 71 is formed that gradually descends toward the rear side. Apart from a part close to the rear end of the palming grip part 70, the downward inclined surface 71 is formed in the entire region of the lower surface of the palming grip part 70. The downward inclined surface 71 may have a shape descending linearly to the rear side, however, in the present embodiment, the downward inclined surface 71 has a shape bent to the upper side so that the inclination angfootradually becomes larger toward the rear side. Thus, a rear part of the downward inclined surface 71 is positioned further away from the center line of the rod main body 1 towards downward. The topmost part 64 of the support wall 61 is positioned at a position on the upper side which is corresponds to a center of the downward inclined surface 71 in the front-rear direction.

The palming grip part 70 includes a protrusion part 72 configured to protrude downwardly from a rear part of the palming grip part 70. The protrusion part 72 protrudes toward the rear side in a direction inclined at a predetermined angle with respect to the up-down direction. Furthermore, a dimension of the protrusion part 72 in the front-rear direction becomes gradually smaller toward a lower end part 72a (tip end part) of the protrusion part 72. The downward inclined surface 71 extends to continue smoothly until the lower end part 72a of the protrusion part 72 and a rear end part of the downward inclined surface 71 forms the lower end part 72a of the protrusion part 72. Note that, as illustrated in FIG. 14, a width of the protrusion part 72 in the left-right direction gradually becomes smaller toward the lower end part. The protrusion part 72 is positioned more on the rear side than the support wall 61, in particular, a position of the lower end part 72a of the protrusion part 72 in the front-rear direction is more on the rear side than a position of the topmost part 64 of the support wall 61 in the front-rear direction and is more on the rear side than the rear surface 65 of the support wall 61. The palming grip part 70 includes, on a rear side of the protrusion part 72, a rearward extension part 73 extending toward the rear side from an upper end part (base end part) of the rear surface of the protrusion part 72. The rearward extension part 73 is positioned outside the grip body 16 in the radial direction and is positioned on the lower side.

Attached State of Dual-Bearing Reel 100

FIGS. 18 to 20 illustrate a state where the dual-bearing reel 100 is attached to a reel seat mounted in the rod main body 1. A state where the dual-bearing reel 100 is positioned on an upper side of the fishing rod is considered a normal state. The handle 105 of the dual-bearing reel 100 is positioned on the right side and the lateral bulging part 60 and the support wall 61 are positioned on the left side opposite to the handle 105 side. As illustrated in FIG. 20, in plan view, the lateral bulging part 60 does not protrude more to the outside than the left side wall 103 of the dual-bearing reel 100 and is positioned at an inside, that is, at a position closer to the center line of the rod main body 1. As illustrated in FIG. 18, the front upper surface 60a of the lateral bulging part 60 is positioned so as to face a lower side of a lower surface front part of the left side wall 103 of the dual-bearing reel 100 while opening a predetermined gap. The lower surface front part of the side wall 103 is a portion more on the front side than a bottommost part 103a from among the lower surface of the side wall 103.

The support wall 61 is positioned immediately behind the left side wall 103 of the dual-bearing reel 100. The front-side inclined surface 62 of the support wall 61 is positioned so as to face a rear side of a lower surface rear part 103b of the left side wall 103 of the dual-bearing reel 100 while opening a predetermined gap. The lower surface rear part 103b of the side wall 103 is a portion more on the rear side than the bottommost part 103a from among the lower surface of the side wall 103. The front end part 62a of the front-side inclined surface 62 of the support wall 61 is positioned immediately below or close to the bottommost part 103a of the left side wall 103 of the dual-bearing reel 100. As illustrated in FIG. 18, the lower surface rear part 103b of the left side wall 103 of the dual-bearing reel 100 gradually rises from the bottommost part 103a of the left side wall 103 of the dual-bearing reel 100 toward the rear side while curving, and, to correspond to a shape of this rise, the front-side inclined surface 62 of the support wall 61 gradually rises from the front end part 62a toward the rear side while curving. The topmost part 64 of the support wall 61 is positioned immediately behind or close to a rearmost part 103c of the left side wall 103 of the dual-bearing reel 100 and the height of the topmost part 64 of the support wall 61 is about equal to or slightly smaller than the height of the rearmost part 103c of the left side wall 103 of the dual-bearing reel 100.

As illustrated in FIG. 20, in plan view, the support wall 61 does not protrude more to the outside than the left side wall 103 of the dual-bearing reel 100 and is positioned more on the inner side than left side wall 103 of the dual-bearing reel 100. On the other hand, the inner surface of the support wall 61 is spaced a predetermined distance from the outside with respect to the center line of the rod main body 1 and the support wall 61 does not interfere with the clutch 106 and a rear of the clutch 106 is in a free state.

Palming

FIGS. 19 and 20 illustrate a left hand during palming by two-dot chain lines. During palming, the left hand holds the dual-bearing reel 100 and the reel seat so as to envelope the dual-bearing reel 100 and the reel seat. Specifically, a portion of the ball of the thumb of the left hand contacts an upper surface (in particular, a topmost part of the upper surface) of the left side wall 103 of the dual-bearing reel 100 and the palming grip part 70 is held by the four fingers from the index finger to the little finger. When the four fingers from the index finger to the little finger come in contact with and hold the downward inclined surface 71 of the palming grip part 70 as illustrated in FIG. 19, a holding force by the four fingers is exerted obliquely upward and backward onto the downward inclined surface 71 of the palming grip part 70, as indicated by an arrow P in FIG. 19. The support wall 61 is positioned on an extension line in the direction of the arrow P. That is, the support wall 61 obliquely protrudes upwards and backwards along the direction of the arrow P. Furthermore, the rear-side inclined surface 63 of the support wall 61 abuts against the palm thenar of the hand during palming. Thus, the reel seat is held in the inclined direction by the palm thenar of the hand and the four fingers from the index finger to the little finger. Furthermore, the outer surface of the lateral bulging part 60 abuts against the spherical contact part positioned at the joints of the fingers from the index finger to the little finger and the outer surface of the support wall 61 abuts against a central part of the hand's palm between the spherical contact part and the palm thenar.

The support wall 61 is formed on the left-side part of the reel seat main body in this way, and thus, the outer surface of the support wall 61 abuts against the hand's palm of the left hand during palming and the palm of the left hand is supported from the inner side by the support wall 61 immediately behind the left side wall 103 of the dual-bearing reel 100. Furthermore, the lateral bulging part 60 is formed on a left-side part of the reel seat main body and thus, the fit feeling during palming is improved by the lateral bulging part 60 and the support wall 61. Furthermore, an excellent fit feeling is obtained and thus, a burden on the fisher's hand is reduced and fishing can be performed comfortably over a long time.

In particular, the front-side inclined surface 62 of the support wall 61 faces the lower surface rear part 103b of the left side wall 103 of the dual-bearing reel 100 and thus, the outer surface of the support wall 61 naturally fits into the hand's palm. The front-side inclined surface 62 of the support wall 61 is inclined backwards and extends obliquely upward along the risen shape of the lower surface rear part 103b of the left side wall 103 of the dual-bearing reel 100 and thus, the lower surface rear part 103b of the left side wall 103 of the dual-bearing reel 100 is not largely spaced apart from the support wall 61 and an excellent hold feeling and fit feeling during palming are obtained. Furthermore, the rear-side inclined surface 63 is disposed on the upper surface of the support wall 61 and the rear-side inclined surface 63 abuts against the palm thenar of the hand during palming and thus, the fit feeling during palming is further improved.

Furthermore, the downward inclined surface 71 is formed on the palming grip part 70 and thus, the palm thenar of the hand naturally abuts against the support wall 61 by pushing the downward inclined surface 71 to the inner side by a finger such as the middle finger and the ring finger. The downward inclined surface 71 of the palming grip part 70 and the rear-side inclined surface 63 of the support wall 61 are inclined into the same direction and thus, the reel seat can be firmly held in the inclined direction. Moreover, the downward inclined surface 71 of the support wall 61 can be firmly pressed against the palm thenar of the hand and thus, the hand's palm more closely contacts with the dual-bearing reel 100 and the reel seat. Furthermore, the inclination angle of the downward inclined surface 71 of the palming grip part 70 gradually increases towards the rear side, and thus, secure holding by the fingers including the little finger is possible and the burden on the fingers is reduced.

Constituting Members of Reel Seat Main Body

Next, constituting members of the reel seat main body according to the present embodiment will be described. The reel seat main body is constituted from a plurality of members detachable from each other. The reel seat main body includes a fixed member and an exchangeable member 11 that is formed separately from the fixed member. The fixed member is fixed to the rod main body 1 by adhesion. The fixed member constitutes a main part of the reel seat main body and includes the reel foot mounting part 5, the fixed hood part 6, the hood-use male screw part 7, and the holding-use male screw part 8. The exchangeable member 11 constitutes a lower portion of the reel seat main body, can be removed in a lower direction with respect to the fixed member, and is attached detachably in the lower direction. The exchangeable member 11 includes the lateral bulging part 60, the support wall 61, and the palming grip part 70.

Fixed Member

The fixed member may be configured from one member, however, in the present embodiment, the fixed member is configured from two members on the front and rear that are formed separately from each other. That is, the fixed member is configured from a main body member 12 that is a front portion and a main part of the fixed member and a cylindrical member 13 that constitutes a rear portion of the fixed member. The main body member 12 and the cylindrical member 13 are connected to each other in the front-rear direction. Specifically, a rear end surface 12a of the main body member 12 and a front end surface 13a of the cylindrical member 13 are in surface contact so as to face each other in the front-rear direction and the main body member 12 and the cylindrical member 13 are united by a screw 14. However, an attachment method of the main body member 12 and the cylindrical member 13 is not limited to the screw 14 and any method such as adhesion and the like may be used.

Main Body Member 12

The reel foot mounting part 5, the fixed hood part 6, and the hood-use male screw part 7 are formed on the main body member 12. The main body member 12 has a cylindrical shape as a whole, however, in a midway part of the main body member 12 in the front-rear direction, from among the entire circumference, a region of about half of the lower side is cut out to leave only a region of about half of the upper side. That is, the main body member 12 is divided, in order from the front side, into a cylindrical front tube part 20, an upper half-cut part 21 having an upper-half cut shape of only the upper side, and a cylindrical rear tube part 22. The hood-use male screw part 7 is formed on the front tube part 20, the reel foot mounting part 5 is formed mainly on an upper surface of the upper half-cut part 21, and the fixed hood part 6 is formed on the rear tube part 22. In this way, the upper half-cut part 21 is configured as a half-cut shape of only the upper region and thus, the rod insertion aperture 4 opens to a lower direction of the upper half-cut part 21. Furthermore, the front tube part 20 and the rear tube part 22 that are two tube parts, are formed on the front and rear of the upper half-cut part 21, and the main body member 12 is directly or indirectly fixed to the front tube part 20 and the rear tube part 22 over the entire circumference on the outer peripheral surface of the rod main body 1 and thus, the main body member 12 can be surely fixed to the rod main body 1, even when including the upper half-cut part 21. Apart from a rear end part of the front tube part 20, the front tube part 20 is exposed to the outside without being covered by the exchangeable member 11, however, an upper region of the rear tube part 22 is exposed to the outside without being covered by the exchangeable member 11, while a lower region of the rear tube part 22 is covered by the exchangeable member 11 and thus not exposed to the outside.

Figure 5:
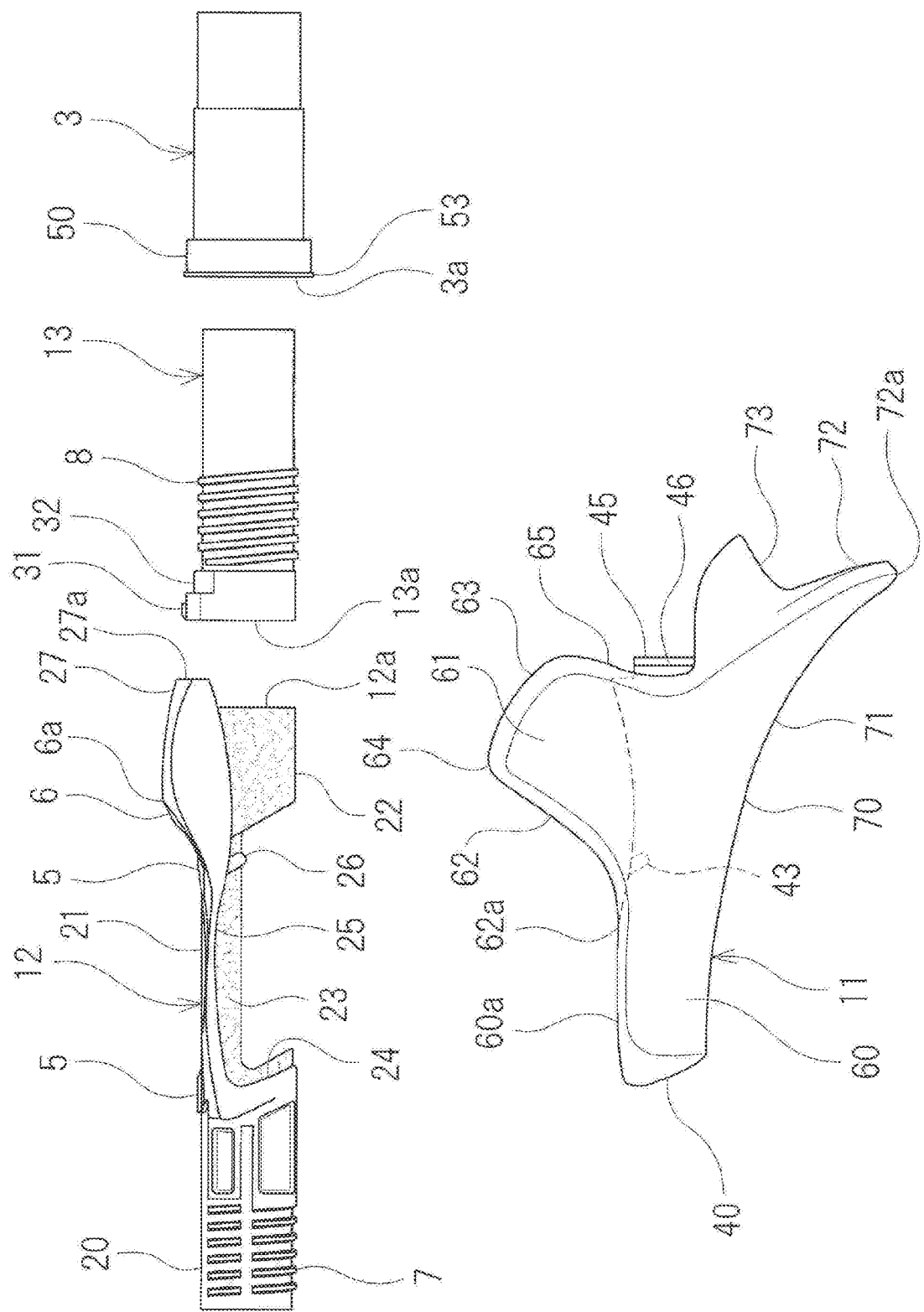
FIG. 5 is an exploded view of the reel seat.

The exchangeable member 11 is attached to the main body member 12 from below. Thus, an overlapping surface 23 is formed on an outer surface of a lower portion of the main body member 12, in which the exchangeable member 11 overlaps from an outer side in the radial direction with the main body member 12. In FIG. 5, a location of the overlapping surface 23 is indicated by multiple dots. On the overlapping surface 23, the main body member 12 and the exchangeable member 11 overlap on an inside and outside to form a double structure. Specifically, the overlapping surface 23 is formed from a lower part of the rear end part of the front tube part 20 to a lower part of the upper half-cut part 21 and the rear tube part 22 and cannot be seen due to being covered by the exchangeable member 11 in a state where the exchangeable member 11 is attached to the main body member 12.

The overlapping surface 23 is formed to be positioned more on an inner side of the radial direction with respect to an outer surface of the main body member 12. That is, a stepped part is formed at a boundary part between the overlapping surface 23 and the outer surface of the main body member 12. The stepped part is configured from a front stepped part 24 positioned at a front end part of the overlapping surface 23 and an upper stepped part 25 extending in a rear direction from an upper end part of the front stepped part 24 until reaching a rear end part of the main body member 12. The front stepped part 24 is directed from a bottommost part to both left and right sides, has a left-right symmetry relation, extends upwards, and has an approximately U-shaped form seen from the front-rear direction. More specifically, the front stepped part 24 extends from the bottommost part in the upward direction, while inclining to the front, and thus, the front stepped part 24 has an inclined surface ascending toward the front. The inclined surface is formed on each of the left and right side. In the present embodiment, the inclined surface is formed over an entire length of a front stepped part 23. Furthermore, the front stepped part 24 constitutes a receiving part configured to receive a front end part 40 of the exchangeable member 11 and constitutes a locking part configured to lock the front end part 40 of the exchangeable member 11 from a lower side. The fixed member includes a first locking part 24a. The exchange member includes a second locking part 40a.

In the upper half-cut part 21, the overlapping surface 23 extends in the front-rear direction to form a left-right pair. Locking projection parts 26 are formed as intermediate locking parts on each of the overlapping surfaces 23 forming the left-right pair of overlapping surfaces 23 in the upper half-cut part 21. The left and right overlapping surfaces 23 respectively face left and right towards the outside and the locking projection parts 26 are arranged to project left and right towards the outside. The locking projection parts 26 extend from the upper stepped part 25 downwards and rearwards and a lower end part of the locking projection parts 26 protrudes more downwards than a lower end part of the overlapping surfaces 23. Note that the lower end part of the locking projection parts 26 is curved in an arc-shaped form in the front-rear direction. The locking projection parts 26 are positioned in a rear part of the upper half-cut part 21, are positioned in a center part of the upper stepped part 25, and the locking projection parts 26 of the left-right pair of locking projection parts 26 are arranged opposite from each other.

Figure 6:
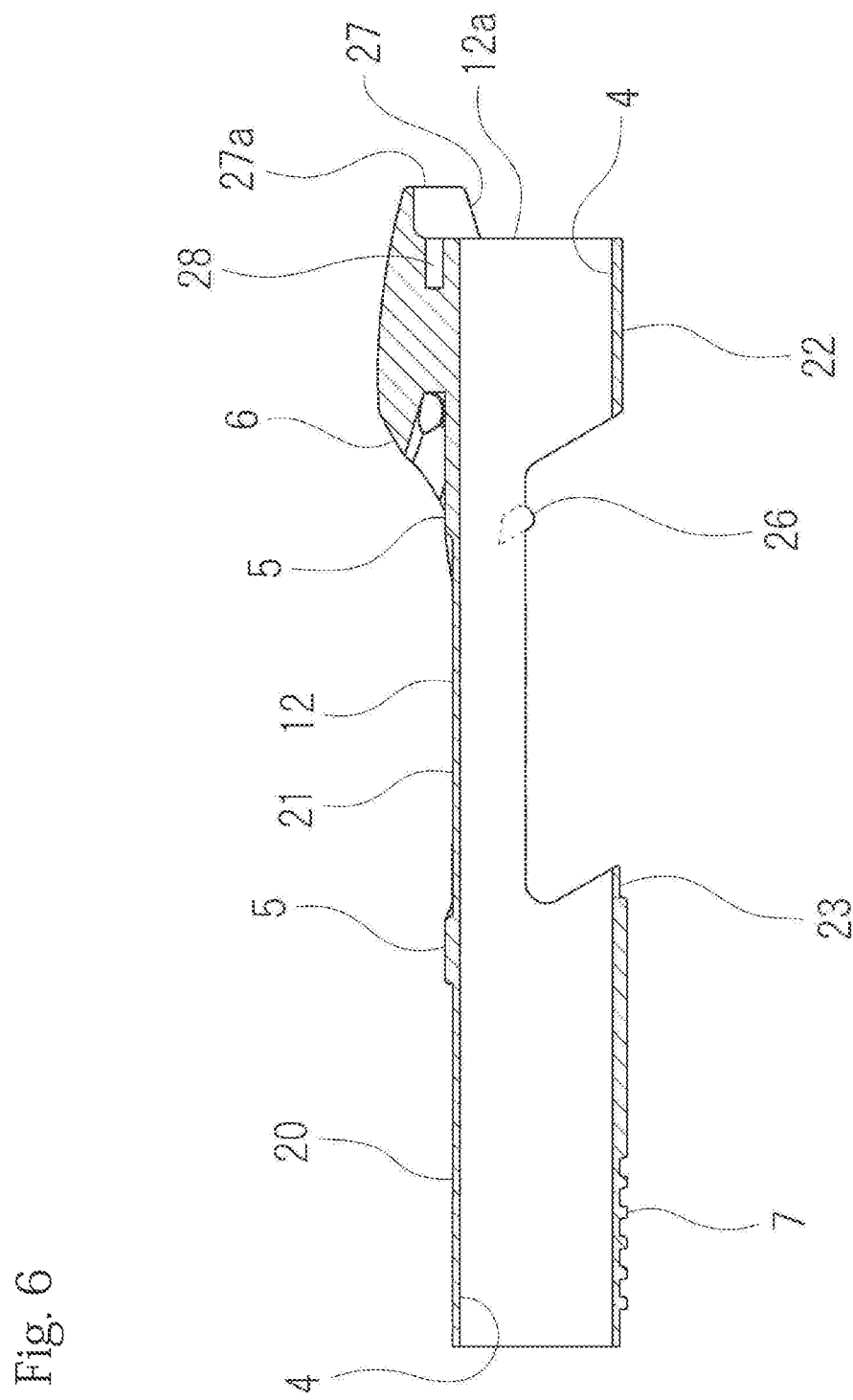
FIG. 6 is a longitudinal sectional view of a main body member of the reel seat cut along the axial direction.

As illustrated in FIG. 6, the rear end surface 12a of the main body member 12 is a connecting surface with the cylindrical member 13. The connecting surface is a surface orthogonal to the front-rear direction and is formed over an entire circumference of a rear end opening of the rod insertion aperture 4. On an upper part of the connecting surface, a cover piece part 27 is arranged to protrude rearwards in an eaves-like shape. As illustrated in FIG. 14, the cover piece part 27 has an arc-shaped form when seen from the rear and a central angle of the cover piece part 27 is less than 180 degrees. Furthermore, a dimension of an upper part from among the entire circumference of the connecting surface becomes locally greater in the radial direction and in a center part of the upper part of the connecting surface in the left-right direction, a prepared hole 28 is formed for screw-fastening the cylindrical member 13 to the main body member 12. The prepared hole 28 is positioned immediately below a base end part of the cover piece part 27.

Cylindrical Member 13

The front end surface 13a of the cylindrical member 13 is a connecting surface of the cylindrical member 13. The connecting surface of the cylindrical member 13 is also a surface orthogonal to the front-rear direction, the connecting surface of the cylindrical member 13 abuts against the connecting surface of the main body member 12 from a rear side, and the main body member 12 and the cylindrical member 13 are connected to each other on the same axis to form one structure. A first bulging part 31 and a second bulging part 32 are formed on an outer peripheral surface of a front part of the cylindrical member 13. The first bulging part 31 is positioned on a front end part of the cylindrical member 13 and the second bulging part 32 is connected consecutively to a rear side of the first bulging part 31. The first bulging part 31 bulges upwards in a flange shape and enters an inner side of the cover piece part 27 of the main body member 12 in the radial direction when the cylindrical member 13 is attached to the main body member 12. That is, the first bulging part 31 is covered by the cover piece part 27 from an outer side in the radial direction and a rear surface of the first bulging part 31 approximately flushes with a rear end surface of the cover piece part 27. An upper surface of the first bulging part 31 is a peripheral surface curved in the circumferential direction (curved surface) and faces an inner surface of the cover piece part 27. Similarly to the first bulging part 31, the second bulging part 32 bulges upwards in a flange shape, however, a height of the second bulging part 32 is lower than a height of the first bulging part 31 and an extent of upwards bulging of the second bulging part 32 is small. An upper surface of the second bulging part 32 is also a peripheral surface curved in the circumferential direction and is positioned on approximately the same circle at approximately the same radius as an outer peripheral surface of a later-described protrusion piece part 45 of the exchangeable member 11.

Figure 7:
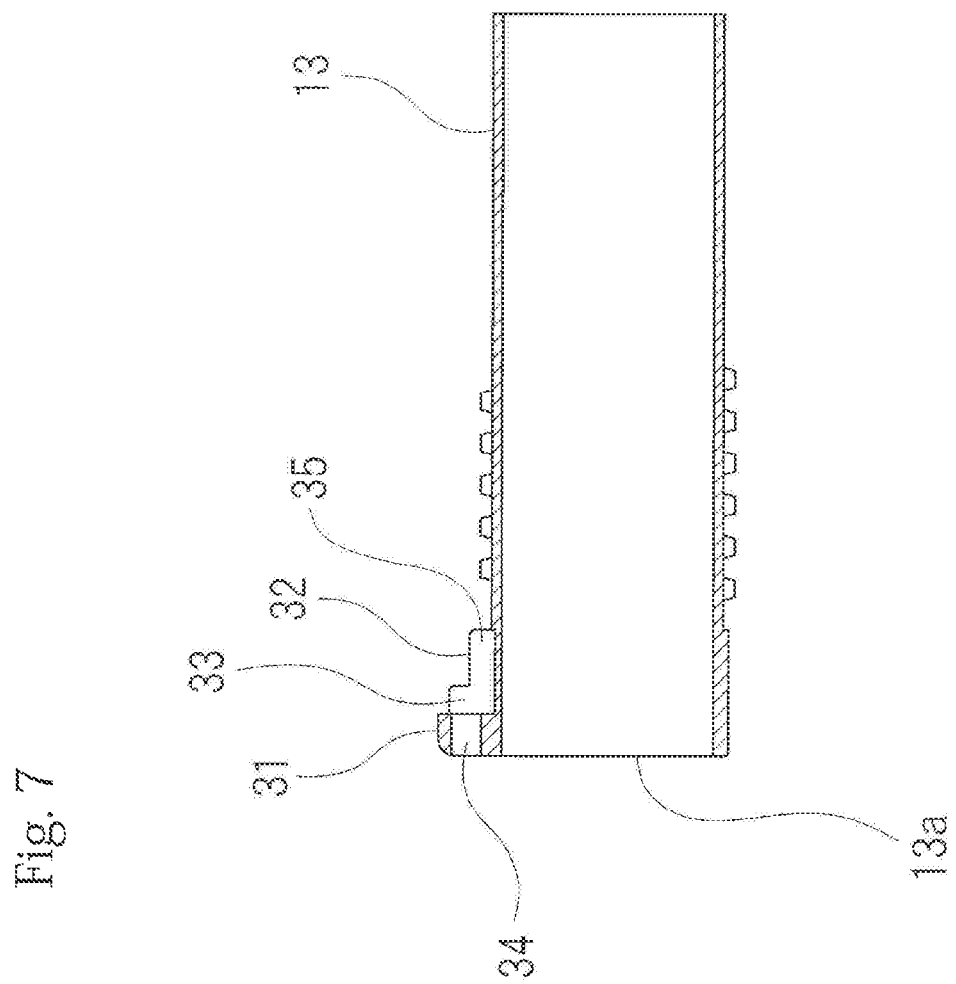
FIG. 7 is a longitudinal sectional view of a cylindrical member of the reel seat cut along the axial direction.
Figure 8:
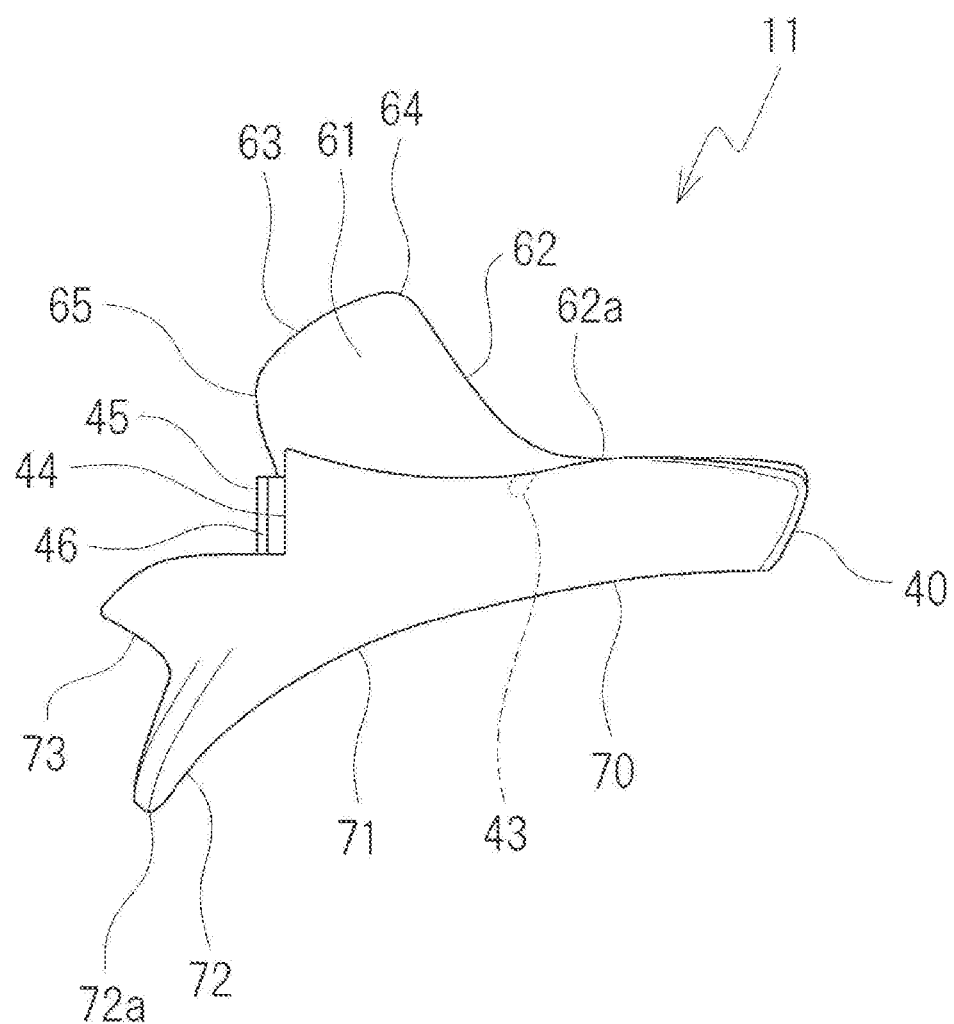
FIG. 8 is a rear view of an exchangeable member of the reel seat.
Figure 9:
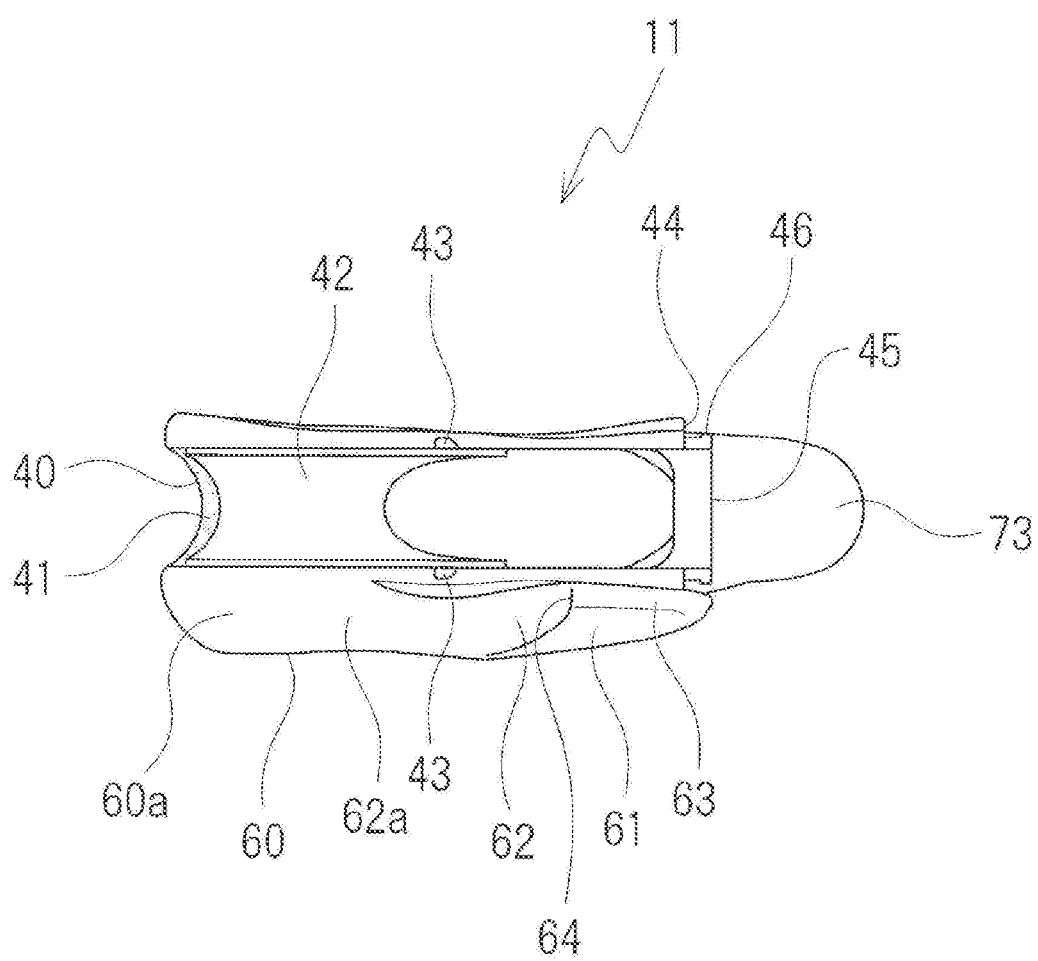
FIG. 9 is a plan view of the exchangeable member.

As illustrated in FIG. 7, an upwardly open counterbore recessed part 33 for the screw 14 is formed on a top part of the upper surface of the first bulging part 31, a screw-use through hole 34 is formed on a front side of the counterbore recessed part 33, and the screw 14 is screwed into the prepared hole 28 of the main body member 12 from the counterbore recessed part 33 via the screw-use through hole 34. In this way, the cylindrical member 13 is screw-fastened to the main body member 12 by the one screw 14 in the top part of the first bulging part 31. The screw 14 functions as a temporary fastening and also serves for positioning in the circumferential direction between the main body member 12 and the cylindrical member 13. The cylindrical member 13 is screw-fastened in the upper part of the main body member 12 by the one screw 14 when viewed as the reel seat alone, however, both of the main body member 12 and the cylindrical member 13 are adhered to the rod main body 1 when the reel seat is attached to the rod main body 1. Note that a head part of the screw 14 is positioned at an inner side of the cover piece part 27 of the main body member 12 and is concealed by the inner side of the cover piece part 27. On a top part of the upper surface of the second bulging part 32, a recessed groove 35 that is continuous to the counterbore recessed part 33 of the first bulging part 31 is formed to cross the second bulging part 32 in the front-rear direction. During assembling work for combining the cylindrical member 13 with the main body member 12, the screw 14 can be tightened from the recessed groove 35 by a screwdriver, for example. The holding-use male screw part 8 is formed at a rear side of the second bulging part 32 and an outer peripheral surface of a portion from a rear end part of the holding-use male screw part 8 to a rear end part of the cylindrical member 13 is a smooth outer peripheral surface without any unevenness.

Exchangeable Member 11

The exchangeable member 11 covers from below a lower opening that opens at a lower side of the upper half-cut part 21 of the main body member 12. A main part constituting a major portion of the whole length of the exchangeable member 11 is formed as a lower half-cut shape and the exchangeable member 11 substantially forms an arc shape forming a half circle or a U-shape in a cross-sectional view. A front end part 40 of the exchangeable member 11 has a form corresponding to the front stepped part 24 of the main body member 12. The front stepped part 24 of the main body member 12 has a left-right pair of inclined surfaces and thus, the front end part 40 of the exchangeable member 11 also has an inclined surface corresponding thereto and extending from the bottommost part while inclining to the front and upwards. The inclined surface of the front end part 40 of the exchangeable member 11 is locked by the inclined surface that is the locking part of the main body member 12. Thus, the inclined surface of the front end part 40 of the exchangeable member 11 constitutes a part to be locked.

An overlapping surface 41 corresponding to the overlapping surface 23 of the main body member 12 is formed on an inner surface of the exchangeable member 11. Note that a location of the overlapping surface 41 of the exchangeable member 11 is indicated by multiple dots in FIG. 12. Furthermore, a part of the inner surface of the exchangeable member 11 constitutes a wall surface 42 of the rod insertion aperture 4. The overlapping surface 41 is formed more on the outer side of the radial direction than the wall surface 42 of the rod insertion aperture 4. Furthermore, on an inner surface of a midway part of the exchangeable member 11 in the front-rear direction, locking recessed parts 43 are formed in which the locking projection parts 26 of the main body member 12 are engaged. The locking recessed parts 43 are formed as a left-right pair, correspond to the locking projection parts 26 of the main body member 12, and are formed directed inclined rearwards from an upper end part of the exchangeable member 11. Note that the locking recessed parts 43 are formed on the overlapping surface 41, however, a lower end part of the locking recessed parts 43 slightly exceeds the overlapping surface 41 in the lower direction and reaches the wall surface 42 of the rod insertion aperture 4.

Figure 10:
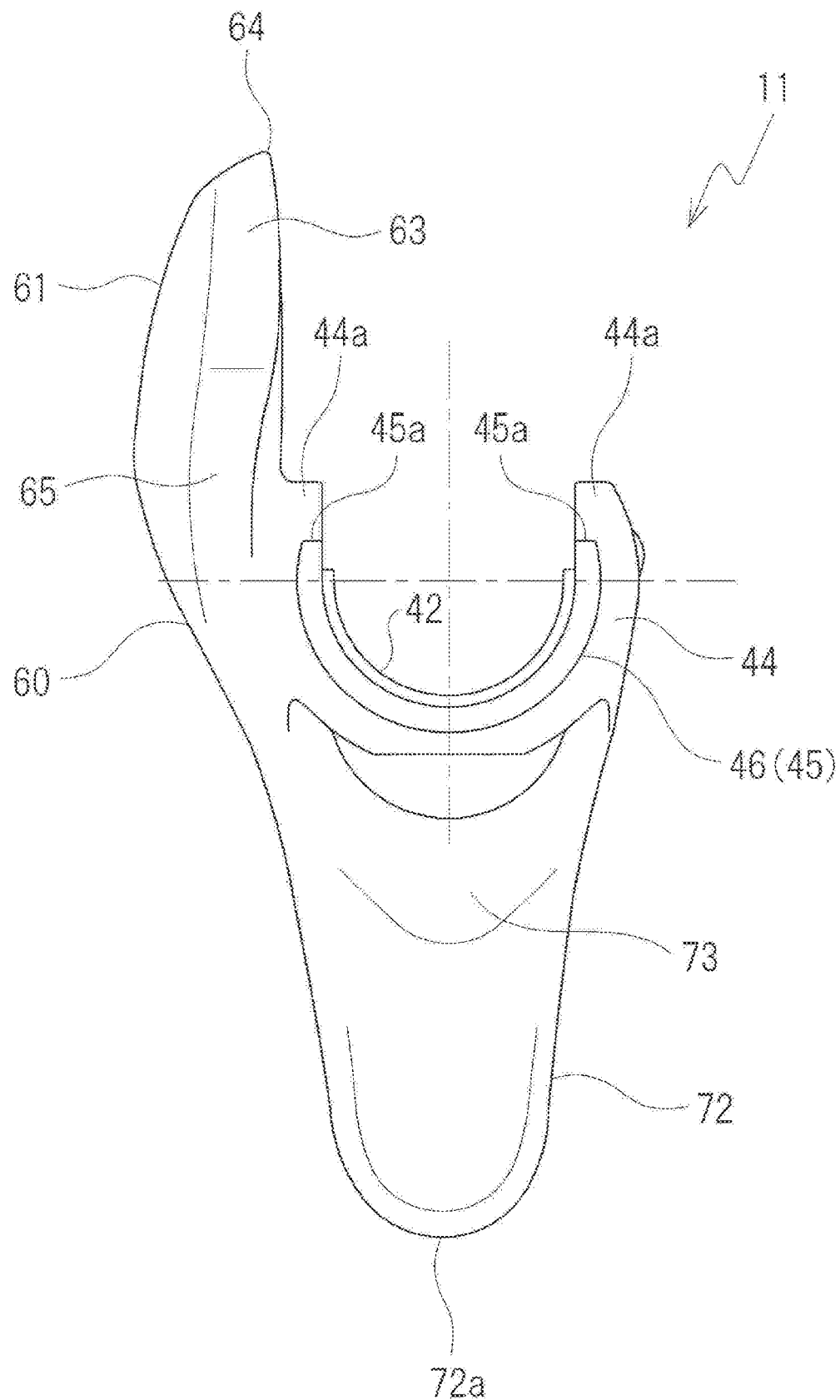
FIG. 10 is a side view of the exchangeable member seen from a butt side of the rod in the axial direction.
Figure 11:
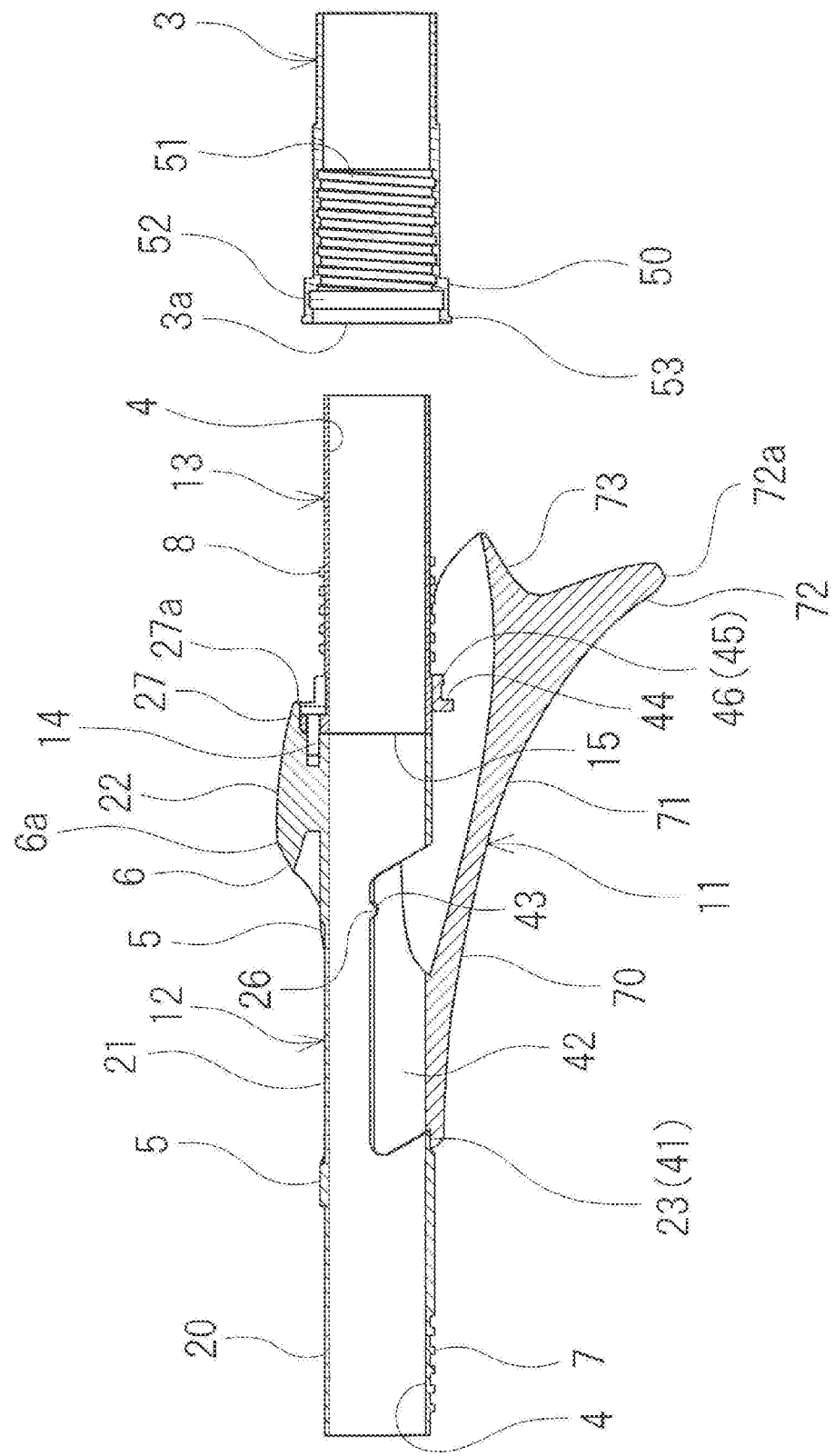
FIG. 11 is longitudinal sectional view of the reel seat cut along the axial direction and illustrates a state where a holding-use nut is detached.
Figure 12:
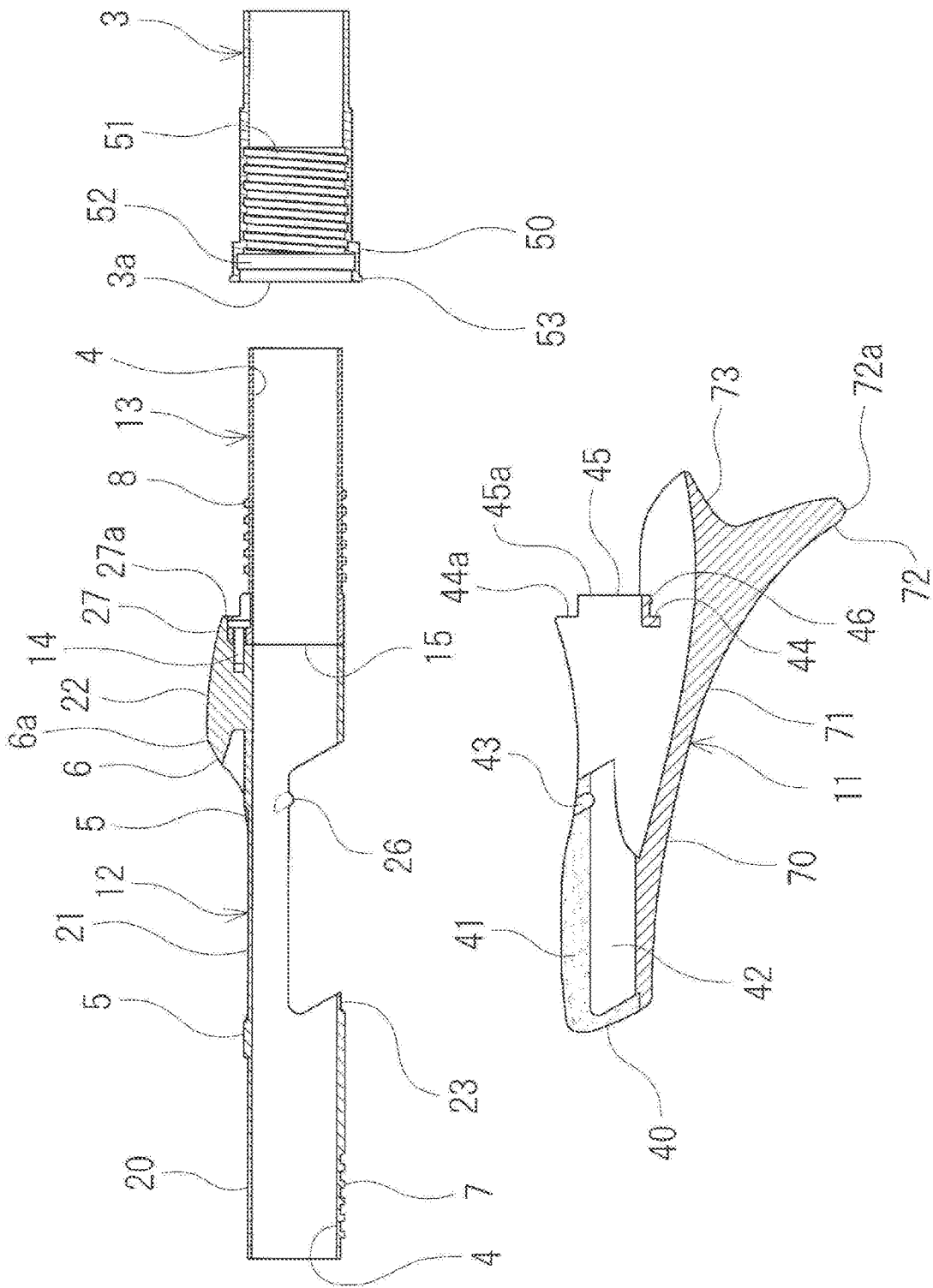
FIG. 12 is longitudinal sectional view of the reel seat cut along the axial direction and illustrates a state where the holding-use nut and the exchangeable member are detached.
Figure 15:
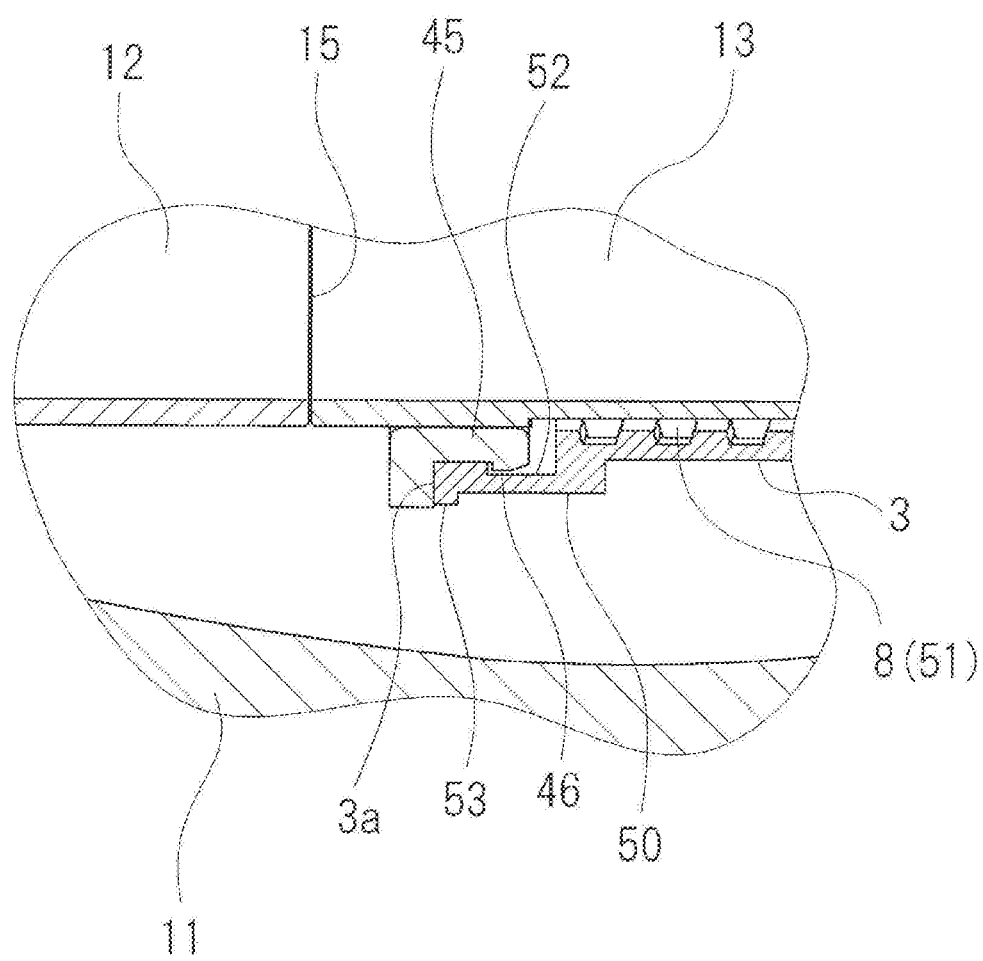
FIG. 15 is an enlarged view illustrating main parts of FIG. 4.

On a rear end part of a lower half-cut part of the exchangeable member 11, a pressed surface 44 that is a surface orthogonal to the front-rear direction is formed as a pressed part and a protrusion piece part 45 is formed that protrudes rearwards from an end part of an inner side of the pressed surface 44 in the radial direction. The pressed surface 44 is a rear end surface of the lower half-cut part and therefrom, the protrusion piece part 45 protrudes further rearwards. The exchangeable member 11 includes the lower half-cut part that is a lower half portion, however, at a rear end part of the lower half-cut part, the exchangeable member 11 extends upwards for a predetermined length exceeding a lower-side half-circle (180 degrees). As illustrated in FIG. 10, when looking at the rear end part of the lower half-cut part of the exchangeable member 11 from behind, the rear end part of the lower half-cut part of the exchangeable member 11 has a shape from a U-shape to a C-shape that is open at the top, and the pressed surface 44 also has a shape from a U-shape to a C-shape that is open at the top. Furthermore, the protrusion piece part 45 is formed in a region of a predetermined length from among the entire circumference of the pressed surface 44 in the circumferential direction. When seen from the rear, the protrusion piece part 45 has a shape from a U-shape to a C-shape corresponding to the pressed surface 44 and extends for a predetermined length exceeding the lower-side half-circle to the upper direction. However, the protrusion piece part 45 is not formed over the entire length of the pressed surface 44 in the circumferential direction and is not formed at both-end parts 44a of the pressed surface 44 in the circumferential direction. Thus, the both-end parts 44a of the pressed surface 44 in the circumferential direction extend more to the upper side than both-end parts 45a of the protrusion piece part 45 in the circumferential direction. The protrusion piece part 45 is formed by a thin wall, however, as illustrated in FIG. 15, at an outer surface of a tip end part of the protrusion piece part 45, an engaging protrusion 46 is arranged to protrude towards an outer side of the radial direction. The engaging protrusion 46 extends along a circumferential direction of the protrusion piece part 45 and is formed over an entire length of the protrusion piece part 45. As the engaging protrusion 46 is formed in this way at the tip end part of the protrusion piece part 45, the tip end part of the protrusion piece part 45 is locally thicker than the other portions of the protrusion piece part 45.

It is preferable that the exchangeable member 11 is fitted to the fixed member from the lower side and by this fitting, the exchangeable member 11 is held on the fixed member to an extent of not falling off naturally, even without the holding-use nut 3. Furthermore, an upper region from among an entire circumference of a connecting part 15 of the main body member 12 and the cylindrical member 13 is covered from an outer side of the radial direction by the cover piece part 27 of the main body member 12 by screw-fastening the cylindrical member 13 to the main body member 12, however, a remaining lower region not covered by the cover piece part 27 from among the entire circumference of the connecting part 15 is covered by the exchangeable member 11 from the outer side of the radial direction by fitting the exchangeable member 11 into the fixed member. Thus, when the exchangeable member 11 is attached to the fixed member, the connecting part 15 of the main body member 12 and the cylindrical member 13 cannot be seen over the entire circumference.

Figure 13:
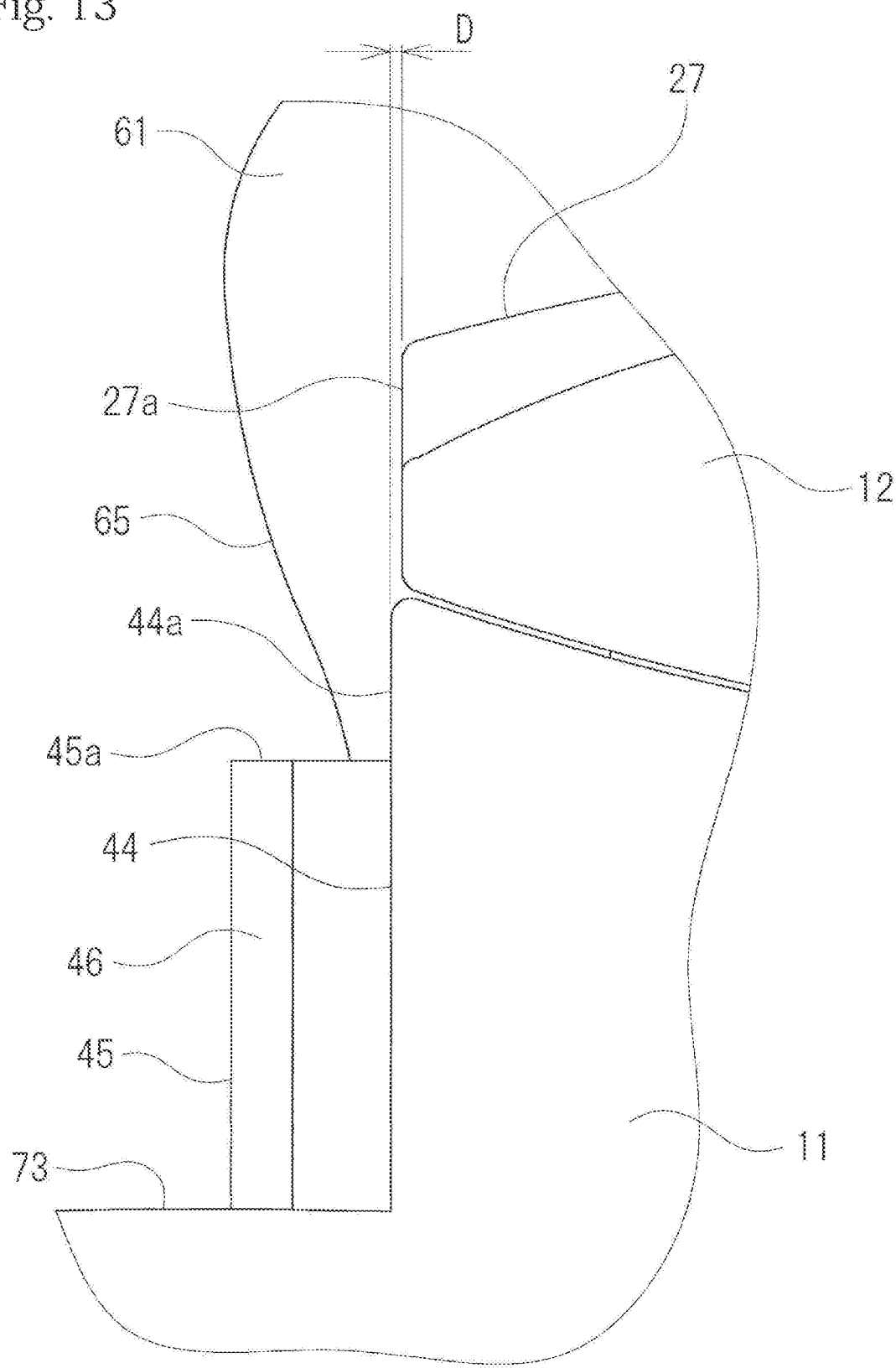
FIG. 13 is a rear view of main parts illustrating a relationship of the main body member and the exchangeable member of the reel seat and illustrates a state where the cylindrical member and the holding-use nut are detached.

In a state in which the exchangeable member 11 is attached to the fixed member in this way, the pressed surface 44 of the exchangeable member 11 is positioned on a lower side of a rear end surface 27a of the cover piece part 27 of the main body member 12 and the protrusion piece part 45 of the exchangeable member 11 is positioned on a lower side of the second bulging part 32 of the cylindrical member 13. Furthermore, as illustrated in FIG. 13, the pressed surface 44 of the exchangeable member 11 protrudes slightly more rearwards than the rear end surface 27a of the cover piece part 27 of the main body member 12. A rearwards protrusion amount D of the pressed surface 44 of the exchangeable member 11 with respect to the rear end surface 27a of the cover piece part 27 of the main body member 12 is small and is 1 mm or less, preferably 0.1 mm or more and 0.5 mm or less. Thus, the pressed surface 44 of the exchangeable member 11 protrudes slightly more rearwards than the rear end surface 27a of the cover piece part 27 of the main body member 12 and therefore, mainly the pressed surface 44 of the exchangeable member 11 is pressed by the holding-use nut 3 to the front side.

The lateral bulging part 60 is formed mainly in the lower half-cut part of the exchangeable member 11. The lateral bulging part 60 is formed over the entire length of the lower half-cut part and is formed continuously from the front end part 40 of the exchangeable member 11 to at least the rear end part of the lower half-cut part, that is, a position of the pressed surface 44. The lateral bulging part 60 is formed in the exchangeable member 11, however, the lateral bulging part 60 is not formed in the fixed member. Similarly, the support wall 61 and the palming grip part 70 are formed in the exchangeable member 11, however, the support wall 61 and the palming grip part 70 are not formed in the fixed member. Thus, by removing the exchangeable member 11 from the fixed member, the lateral bulging part 60, the support wall 61, and the palming grip part 70 including the protrusion part 72, are all together removed from the fixed member. As described above, the reel seat main body has a left-right non-symmetrical shape, however, the fixed member has a left-right symmetrical shape. Accordingly, as the exchangeable member 11 has the left-right non-symmetrical shape, the reel seat main body also has a left-right non-symmetrical shape.

Holding-Use Nut 3

The holding-use nut 3 has a cylindrical shape and a diameter thereof may be constant, however, in the present embodiment, the holding-use nut 3 includes a plurality of portions having different diameters. The holding-use nut 3 includes at a front end part thereof a cylindrical cover part 50 having a greater inner diameter than the other portions. The holding-use nut 3 includes at an inner peripheral surface thereof a female screw part 51 into which the holding-use male screw part 8 is screwed, however, the inner diameter of the cover part 50 is greater than the female screw part 51.

The cover part 50 covers the protrusion piece part 45 of the exchangeable member 11 and the second bulging part 32 of the cylindrical member 13 from an outer side in the radial direction. An engaging groove 52 that extends in the circumferential direction is formed over the entire circumference on an inner peripheral surface of the cover part 50. That is, the engaging groove 52 is ring-shaped. The engaging protrusion 46 of the exchangeable member 11 is engaged with the engaging groove 52 of the holding-use nut 3. The engaging groove 52 is formed at a position on an inner side at a predetermined length from the tip end part from among the inner peripheral surface of the cover part 50. Thus, when the holding-use nut 3 is fastened, an inner peripheral surface of the tip end part of the cover part 50 of the holding-use nut 3 surpasses the engaging protrusion 46 of the protrusion piece part 45 of the exchangeable member 11 and thereafter, the engaging protrusion 46 of the protrusion piece part 45 of the exchangeable member 11 is engaged with the engaging groove 52 of the cover part 50 of the holding-use nut 3.

A front end surface 3a of the holding-use nut 3 constitutes a pressing part configured to press the pressed surface 44 of the exchangeable member 11 to the front side. The outer peripheral surface of the cover part 50 of the holding-use nut 3 may have the same diameter as the other portions, however, in the present embodiment, the outer peripheral surface of the cover part 50 of the holding-use nut 3 has a greater diameter than the other portions. On a front end part of the outer peripheral surface of the cover part 50, a ring-shaped flange part 53 is arranged to protrude towards the outer side of the radial direction. When the ring-shaped flange part 53 is disposed in this way on the outer peripheral surface of the front end part of the holding-use nut 3, a surface area of the front end surface 3a of the holding-use nut 3 can be enlarged.

The female screw part 51 is formed on a rear side of the cover part 50 and an inner peripheral surface from a rear end part of the female screw part 51 to a rear end part of the holding-use nut 3 is a smooth surface. Note that, as illustrated by a two-dot chain line in FIG. 1 and the like, a cylindrical grip body 16 is mounted on an outer side of the holding-use nut 3. The grip body 16 is formed by EVA foam, cork, or the like, for example. A rear part of the palming grip part 70 of the exchangeable member 11 is positioned outside a front part of the grip body in the radial direction and below the front part of the grip body. Specifically, the rearward extension part 73 of the palming grip part 70 is positioned outside the front part of the grip body 16 in the radial direction and below the front part of the grip body 16. An inner surface of the rearward extension part 73 of the palming grip part 70 is positioned below and away from the holding-use male screw part 8 of the cylindrical member 13, and a predetermined space exists between the inner surface of the rearward extension part 73 and the holding-use male screw part 8 of the cylindrical member 13. A front part of the holding-use nut 3 in which the grip body 16 is integrally mounted enters into this space.

Materials

Each of the main body member 12, the cylindrical member 13, the exchangeable member 11, and the holding-use nut 3 may be formed by injection molding. Various types of synthetic resins may be used as a material, and the same material may be used, however, it is preferable to use different materials. In particular, for the main body member 12 and the exchangeable member 11, it is preferable to use a material having relatively high strength compared to the cylindrical member 13 and the holding-use nut 3. A fiber-reinforced resin is preferable as the material of the main body member 12 and the exchangeable member 11, in particular, a fiber-reinforced resin in which short fibers of a length of 1 mm or less are used as the reinforced fiber is preferable. Furthermore, carbon fibers are preferable as the fiber. On the other hand, a material of the cylindrical member 13 and the holding-use nut 3 may also be various types of hard synthetic resins, and it is preferable to use a fiber-reinforced resin, for example, it is possible to use a glass fiber-reinforced nylon resin.

Attachment of Reel Seat to Rod Main Body 1

The reel seat main body is fixed to the rod main body 1. The reel seat main body is directly fixed by adhesion to an outer peripheral surface of the rod main body 1 or is fixed by adhesion via a cylindrical spacer (not illustrated) between the outer peripheral surface of the rod main body 1 and the reel seat main body, for example. The fixed member is fixed to the rod main body 1 and the exchangeable member 11 can be detachably attached to the rod main body 1 via the fixed member.

Attachment and Detachment of Exchangeable Member 11

Figure 16:
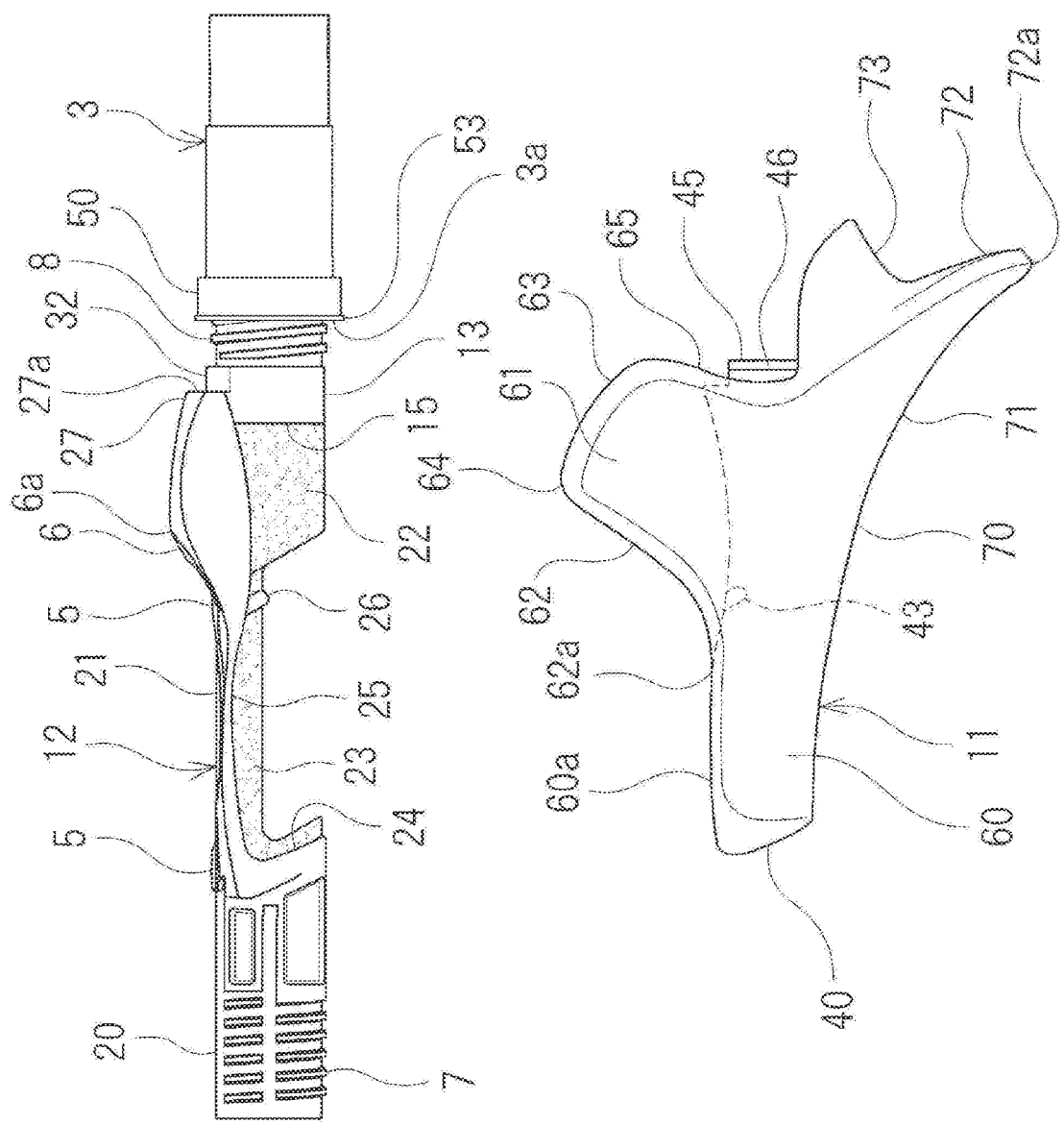
FIG. 16 is a front view illustrating a usage state of the reel seat.

As illustrated in FIG. 16, the exchangeable member 11 is fit into the main body member 12 and the cylindrical member 13 from the lower side in a state where the holding-use nut 3 is loosened. Note that the cylindrical member 13 is attached in advance to the main body member 12 by the screw 14. In a state where the exchangeable member 11 is fit from the lower side into the fixed member, the holding-use nut 3 is rotated and moved to the front side and the cover part 50 of the holding-use nut 3 eventually reaches the protrusion piece part 45 of the exchangeable member 11. The engaging protrusion 46 is formed on the outer peripheral surface of the protrusion piece part 45 of the exchangeable member 11 and thus, the inner peripheral surface of the cover part 50 of the holding-use nut 3 forcibly advances to the front side, while surpassing the engaging protrusion 46 of the protrusion piece part 45 of the exchangeable member 11. Subsequently, when the engaging groove 52 of the cover part 50 of the holding-use nut 3 engages with the engaging protrusion 46 of the protrusion piece part 45 of the exchangeable member 11, the front end surface 3a of the holding-use nut 3 contacts the pressed surface 44 of the exchangeable member 11 and when the holding-use nut 3 is further strongly fastened, the holding-use nut 3 pushes the exchangeable member 11 to the front side. In a state where the exchangeable member 11 is attached in this way, the cylindrical member 13 is covered by the holding-use nut 3 and cannot be seen.

The front end part 40 of the exchangeable member 11 is locked by the inclined surface (the front stepped part 24) that is the locking part of the main body member 12 and thus, the front end part 40 of the exchangeable member 11 is prevented from falling down. On the other hand, in the rear end part of the exchangeable member 11, the protrusion piece part 45 is covered by the cover part 50 of the holding-use nut 3 from the outer side of the radial direction and thus, the rear end part of the exchangeable member 11 is also prevented from falling down. Furthermore, the holding-use nut 3 pushes the exchangeable member 11 to the front side and thus, the exchangeable member 11 is sandwiched from the front side and rear side thereof by the holding-use nut 3 and the main body member 12. Thus, a tight attached state is obtained, in which the exchangeable member 11 does not wobble or the like. Furthermore, when the holding-use nut 3 pushes the exchangeable member 11 to the front side, a force to the upper side is exerted on the front end part 40 of the exchangeable member 11 by the front stepped part 24 that is the inclined surface of the main body member 12, and the exchangeable member 11 automatically moves to the upper side that is the side of the main body member 12 and firmly attaches to the main body member 12.

The exchangeable member 11 is pushed by the holding-use nut 3 and thus, the midway part of the exchangeable member 11 in the front-rear direction can be displaced downwards, however, the locking projection parts 26 are formed as intermediate locking parts on the main body member 12 and engage with the locking recessed parts 43 of the exchangeable member 11 and thus, the midway part of the exchangeable member 11 in the front-rear direction is less likely to be displaced or moved downwards and the exchangeable member 11 is fixed more tightly. In particular, the locking projection parts 26 and the locking recessed parts 43 are inclined in the same direction as the inclined surface (the front stepped part 24) of the main body member 12 and thus, when the exchangeable member 11 is pushed to the front side by the holding-use nut 3, the force to the upper side is exerted not only on the front end part 40 of the exchangeable member 11, but also on the midway part, and thus, the exchangeable member 11 can be pressed and fixed to the main body member 12 tightly over the entire length.

Furthermore, the engaging protrusion 46 is formed on the outer peripheral surface of the protrusion piece part 45 of the exchangeable member 11 and engages with the engaging groove 52 of the holding-use nut 3 and thus, the exchangeable member 11 can be fixed more tightly and the attached state can be maintained. In particular, the protrusion piece part 45 surpasses the lower-side half-circle to extend to the upper side and the engaging protrusion 46 is formed over the entire length of the protrusion piece part 45 in the circumferential direction and thus, the engaged state between the engaging groove 52 and the engaging protrusion 46 becomes more secure and a fixation force of the exchangeable member 11 can be increased. Furthermore, the pressed surface 44 extends further to the upper side than the protrusion piece part 45 and thus, the compressive force from the holding-use nut 3 can also be surely exerted on the exchangeable member 11.

Figure 17:
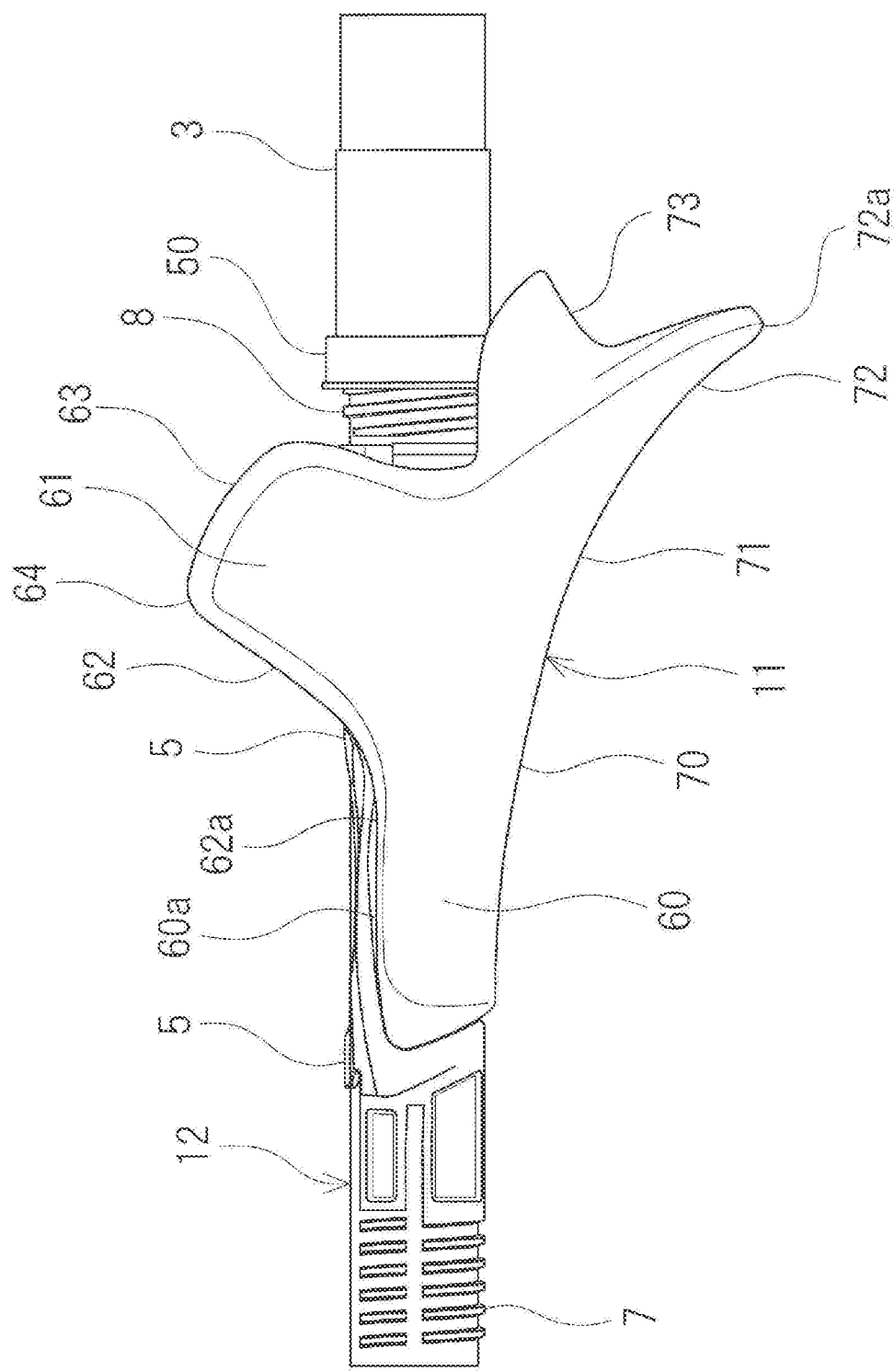
FIG. 17 is a front view illustrating a usage state of the reel seat.

On the other hand, when the exchangeable member 11 is detached from the fixed member, the holding-use nut 3 is moved, from a state as illustrated in FIG. 1 where the exchangeable member 11 is attached, rearwards by rotating in an opposite direction as illustrated in FIG. 17, and the exchangeable member 11 can be separated downwards from the fixed member as illustrated in FIG. 16. Such attachment and detachment work of the exchangeable member 11 can be performed for the reel seat alone and can also be performed in a state where the reel seat is attached to the fishing rod. That is, the exchangeable member 11 can be attached and detached in a state where the fixed member is attached to the rod main body 1.

Thus, when other types of exchangeable members are prepared for the exchangeable member 11, it is possible to change only the exchangeable member 11 in the state where the reel seat is attached to the fishing rod. For example, the exchangeable member 11 in which the support wall 61 is formed on a left side can be changed to the exchangeable member 11 in which the support wall 61 is formed on a right side. Thus, by changing only the exchangeable member 11, the dual-bearing reel 100 including the handle 105 on the left side can be attached to the fishing rod. Furthermore, for fun, it is easily possible to replace the exchangeable member 11 with an exchangeable member of various specifications including a shape and size of the support wall 61, an extent of bulging of the lateral bulging part 60, the inclination angle of the downward inclined surface 71 of the palming grip part 70, a position, size, and existence or non-existence of the protrusion part 72, and the like. Furthermore, the exchangeable member 11 can be easily exchanged to another exchangeable member 11 having different material, color, design, and the like. Thus, the fisher can enjoy freely customizing the reel seat in accordance with the fisher's preference, the type of the reel, the type of targeted fish, the condition, and the like.

Such a change of the exchangeable member 11 can be performed in a state where the reel seat is attached to the fishing rod and thus, the fisher himself can easily perform the change. For example, the exchangeable member 11 can be changed easily also on the location of fishing and further, the exchangeable member 11 can also be changed in the state where the dual-bearing reel 100 is attached to the fishing rod. In particular, the change is possible only by a manipulation to the holding-use nut 3 and thus, the changing operation is extremely simple and the change can be performed quickly. Note that, even if the exchangeable member 11 is detached, the reel foot mounting part 5, the fixed hood part 6, the moveable hood, and the hood-use nut remain unchanged on the reel seat and thus, the dual-bearing reel 100 can also be mounted on a reel seat from which the exchangeable member 11 is detached to perform fishing.

An example of the exchangeable member 11 with a different configuration of the support wall 61 and the palming grip part 70 is illustrated in FIGS. 21 to 24. Furthermore, a reel seat to which this exchangeable member 11 is attached, is illustrated in FIGS. 25 to 29. In this exchangeable member 11, mainly a shape of the support wall 61 and the palming grip part 70 are different from the above-described exchangeable member 11. In this exchangeable member 11, an upwards inclination angle of the front-side inclined surface 62 of the support wall 61 is smaller and a height of the topmost part 64 is slightly lower compared to the exchangeable member 11 described above. On the other hand, a downwards inclination angle of the rear-side inclined surface 63 of the support wall 61 is larger. Furthermore, an inclination angle of the downward inclined surface 71 of the palming grip part 70 is larger, in particular, in the rear part, and the protrusion part 72 also protrudes more downwards. In this way, the shape of the support wall 61 and the palming grip part 70 can be changed in various ways and any change to the exchangeable member 11 having various shapes, is possible.

Note that, in the above-described embodiment, the palming grip part 70 of the exchangeable member 11 includes the protrusion part 72, however, a configuration not including the protrusion part 72 is also possible.

Furthermore, in the embodiment described above, the holding-use nut 3 that is the holding member pushes directly onto the exchangeable member 11, however, a configuration where the holding-use nut 3 pushes the exchangeable member 11 indirectly via another member is also possible.

Moreover, in the above-described configuration, the exchangeable member 11 can be attached and detached with respect to the fixed member, however, the fixed member and the exchangeable member 11 may be integrally formed and configured as one member. That is, a configuration may be so that the lateral bulging part 60, the support wall 61, and the palming grip part 70 are integrally formed with the reel seat main body, similarly to the reel foot mounting part 5, the fixed hood part 6, and the like. Thus, the support wall 61 may be arranged to protrude in continuation from the fixed hood part 6. A configuration not including the holding-use nut 3 and the holding-use male screw part 8 is also possible.

REFERENCE SIGN LIST

1 Rod main body
3 Holding-use nut
3a Front end surface
4 Rod insertion aperture
5 Reel foot mounting part
6 Fixed hood part
6a Top part
7 Hood-use male screw part
8 Holding-use male screw part
11 Exchangeable member
12 Main body member
12a Rear end surface
13 Cylindrical member
13a Front end surface
14 Screw
15 Connecting part
16 Grip body
20 Front tube part
21 Upper half-cut part
22 Rear tube part
23 Overlapping surface
24 Front stepped part
25 Upper stepped part
26 Locking projection part
27 Cover piece part
27a Rear end surface
28 Prepared hole
31 First bulging part
32 Second bulging part 33 Counterbore recessed part
34 Screw-use through hole
35 Recessed groove
40 Front end part
41 Overlapping surface
42 Wall surface of rod insertion aperture
43 Locking recessed part
44 Pressed surface
44a End part of circumferential direction
45 Protrusion piece part
45a End part of circumferential direction
46 Engaging protrusion
50 Cover part
51 Female screw part
52 Engaging groove
53 Flange part
60 Lateral bulging part
60a Front upper surface
61 Support wall
62 Front-side inclined surface
62a Front end part
63 Rear-side inclined surface
64 Topmost part
65 Rear surface
70 Palming grip part
71 Downward inclined surface
72 Protrusion part
72a Lower end part
73 Rearward extension part
100 Dual-bearing reel
101 Reel foot
102 Right side wall
103 Left side wall
103a Bottommost part
103b Lower surface rear part
103c Rearmost part
104 Spool
105 Handle
106 Clutch

The invention claimed is:

1. A reel seat for mounting a dual-bearing reel on a rod main body of a fishing rod extending in a front-rear direction, the reel seat having: an upper side; a lower side opposite to the upper side in an upper-lower direction; a front side; a rear side opposite to the front side in a front-rear direction; a first side and a second side opposite to the first side in a right-left direction, a plan view of the reel seat showing the reel seat in the front-rear direction and the right-left direction, the reel seat comprising:
a fixed member configured to be fixed on the rod main body, and
an exchangeable member attachable to and detachable from the fixed member;
the fixed member comprising:
a reel foot mounting part provided on the upper side for mounting a reel foot of the dual-bearing reel such that a handle of the dual-bearing reel is located on the first side in the right-left direction in the plan view when mounting the dual-bearing reel;
a fixed hood part protruded toward the upper side, the fixed hood part configured to insert a rear end of the reel foot when mounting the dual-bearing reel, the fixed hood part having a top part, a first side and a second side;
a first locking part configured to engage with a front end of the exchangeable member;
a first rear portion provided at the rear side and the first side of the fixed hood part; and
a second rear portion provided at the rear side and the second side of the fixed hood part;
the exchangeable member comprising:
a second locking part disposed on the front end of the exchangeable member and configured to be engaged with the first locking part,
a support wall provided at the second rear portion, the support wall protruded from the rod main body toward the upper side, the support wall comprising a support wall portion of the support wall protruded from the rod main body toward the upper side, the support wall portion having a topmost part located uppermost, the topmost part being higher than the top part of the fixed hood part, the topmost part being higher than the first rear portion; and
a protrusion part protruded from the rod main body toward the lower side, the protrusion part having a lower end part located lowermost, the lower end part located at a rear side of the topmost part;
wherein the support wall portion is positioned at a rear side of the dual-bearing reel and away from a side wall of the dual-bearing reel via a space,
wherein the topmost part of the support wall portion of the support wall supports a palm thenar of a first hand when palming the reel seat, the palm thenar being a concave part between a thumb of the first hand and a wrist of the first hand, the first hand being an opposite to a second hand for holding the handle.

2. The reel seat according to claim 1, wherein the support wall portion comprises:
a front-side inclined surface inclined so as to gradually ascend rearward to reach the topmost part; and
a rear-side inclined surface inclined so as to gradually descend rearward from the topmost part,
wherein the front-side inclined surface faces a lower surface rear part of the second side of the dual-bearing reel,
wherein the rear-side inclined surface configured to support the palm thenar of the first hand when palming the reel seat.

3. The reel seat according to claim 1, wherein the reel seat further comprises:
a lateral bulging part formed on the second side of the reel seat, the lateral bulging part bulging toward the second side in the right-left direction in the plan view, and
wherein the support wall portion is provided at the rear side of the fixed hood part and is continuously formed from the lateral bulging part.

4. The reel seat according to claim 1, further comprising;
a reel seat main body member to provide the reel foot mounting part, wherein the support wall is attachable to and detachable from the reel seat main body member.

5. The reel seat according to claim 1, wherein the hand is at the second side.

6. The reel seat according to claim 2, wherein the hand is at the second side.

7. The reel seat according to claim 4, wherein the hand is at the second side.

8. The reel seat according to claim 1, wherein when the reel seat is provided on the rod main body, the support wall portion does not overlap with the rod main body in the plan view.

9. The reel seat according to claim 1, wherein the exchangeable member comprises a protrusion piece part protruding toward the rear side wherein the reel seat further comprises a holding member which is provided with the fixed member and holds the protrusion piece part.

10. The reel seat according to claim 9, wherein the fixed member comprises a male screw part,
   wherein the holding member comprises:
   a female screw part which is configured to be engaged with the male screw part; and
   a cover part to cover the protrusion piece part from a radially outside thereof when the female screw part is engaged with the male screw part.

11. The reel seat according to claim 1, wherein the protrusion part can be held by index finger, middle finger, ring finger and little finger of the first hand, while the topmost part of the support wall portion of the support wall can be held by the palm thenar of the first hand, such that the axis of the reel is located between the thumb and the index finger and that the reel can be contacted by the thumb.

12. A fishing rod comprising:
   the reel seat according to claim 1; and
   the rod main body.

\* \* \* \* \*